United States Patent
Kapoor et al.

(10) Patent No.: US 11,995,651 B2
(45) Date of Patent: May 28, 2024

(54) INTEGRATED PAYMENT SYSTEM AND METHOD FOR MANAGING PAYMENT TRANSACTIONS WITHIN AN INPUT INTERFACE

(71) Applicant: TALENT UNLIMITED ONLINE SERVICES PRIVATE LIMITED, Delhi (IN)

(72) Inventors: Abhik Kapoor, New Delhi (IN); Ankit Prasad, Gurugram (IN); Rajendra Engla, Khandwa (IN); Rahul Prasad, Gurugram (IN)

(73) Assignee: TALENT UNLIMITED ONLINE SERVICES PRIVATE LIMITED (IN)

( * ) Notice: Subject to any disclaimer, the term of this patent is extended or adjusted under 35 U.S.C. 154(b) by 0 days.

(21) Appl. No.: 17/472,566

(22) Filed: Sep. 10, 2021

(65) Prior Publication Data

US 2022/0076248 A1    Mar. 10, 2022

(30) Foreign Application Priority Data

Sep. 10, 2020   (IN) .............................. 202011039211

(51) Int. Cl.
   *G06Q 30/00* (2023.01)
   *G06Q 20/38* (2012.01)

(52) U.S. Cl.
   CPC ................... *G06Q 20/386* (2020.05)

(58) Field of Classification Search
   CPC .................................................. G06Q 20/386
   USPC ........ 705/39, 1.1, 40, 44, 27.1, 35, 75, 14.1; 235/380, 379
   See application file for complete search history.

(56) References Cited

U.S. PATENT DOCUMENTS

2013/0060678 A1\* 3/2013 Oskolkov ............ G06Q 20/384
                                                        705/39
2020/0382480 A1\* 12/2020 Isaacson .............. G06Q 20/384

OTHER PUBLICATIONS

ProQuestDialogNPL Search History.\*
Adoption of Mobile Payment Platforms: Managing Reach and Range—Kalima S. Staykova & Jan Damsgaard May 6, 2016.\*

\* cited by examiner

*Primary Examiner* — John H. Holly
(74) *Attorney, Agent, or Firm* — Joy S. Goudie; Goudie, PLLC

(57) ABSTRACT

An integrated payment system (IPS) and a method are provided for managing payment transactions within an input interface. A payment system is integrated within a keyboard, independent of a messenger application. The IPS renders a payment interface element (PIE) on the keyboard. In response to a user input action on the PIE, the IPS automatically detects a recipient for a payment transaction during an interaction between a sender and the recipient, through the messenger application. The IPS automatically determines an identifier of the detected recipient and account information linked to the detected identifier for executing a payment transaction between the sender and the recipient. The IPS generates and renders transaction information within the keyboard for convenient user access.

8 Claims, 36 Drawing Sheets

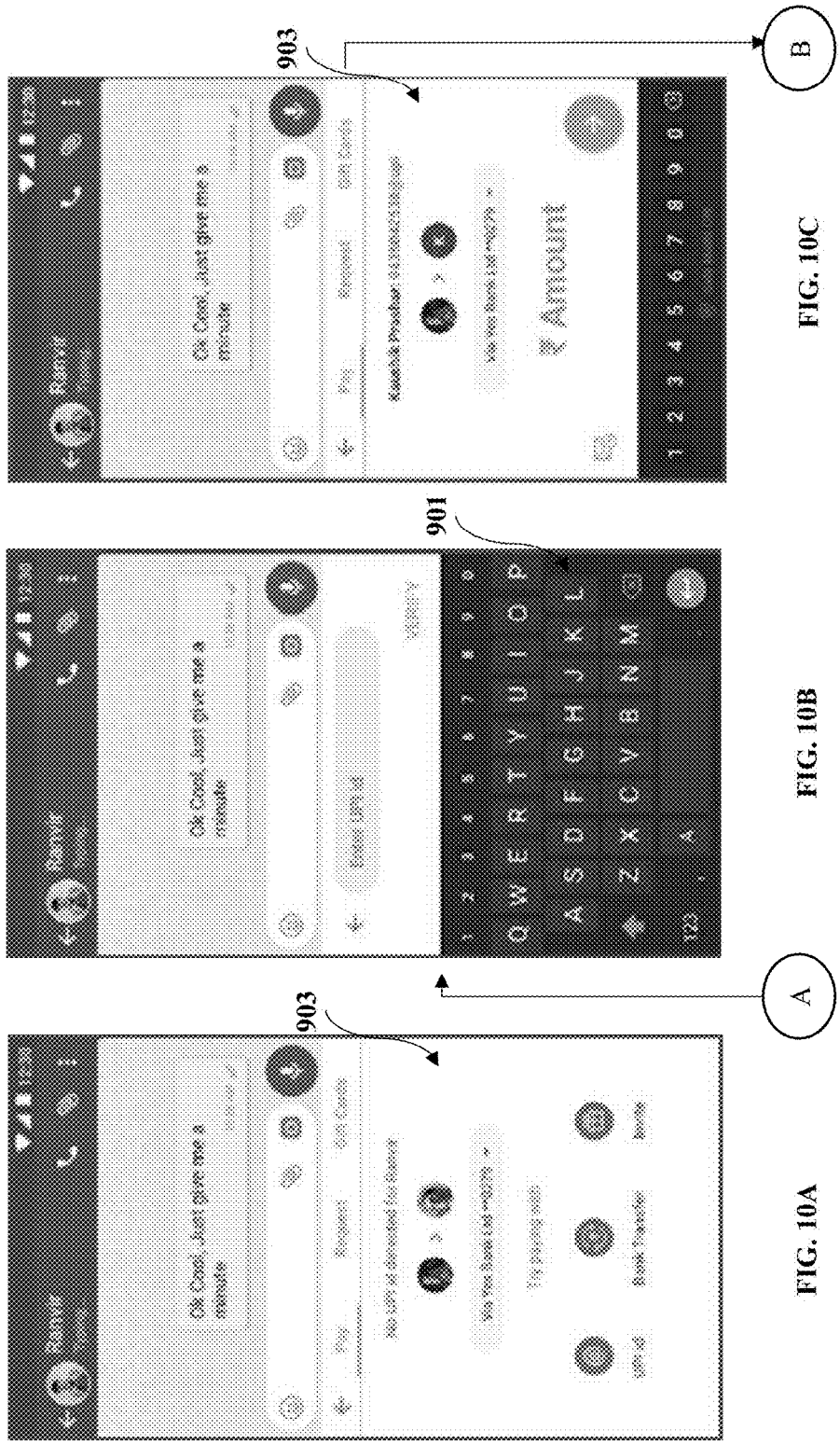

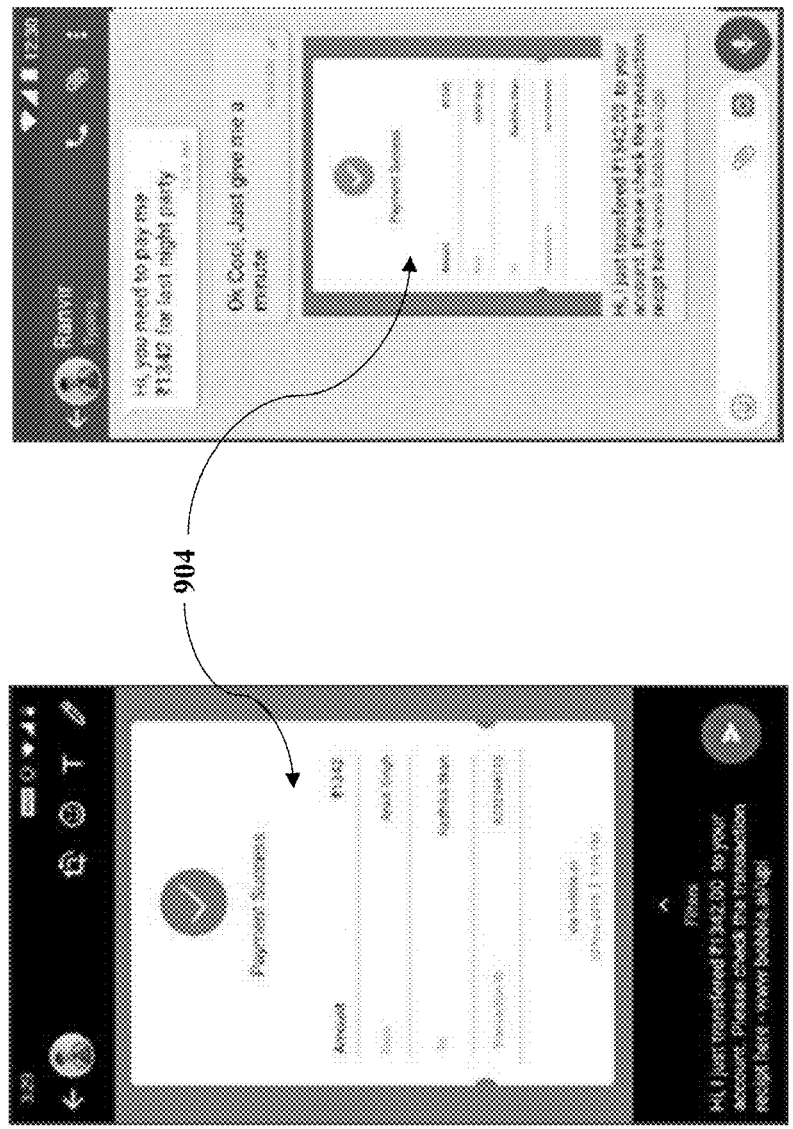

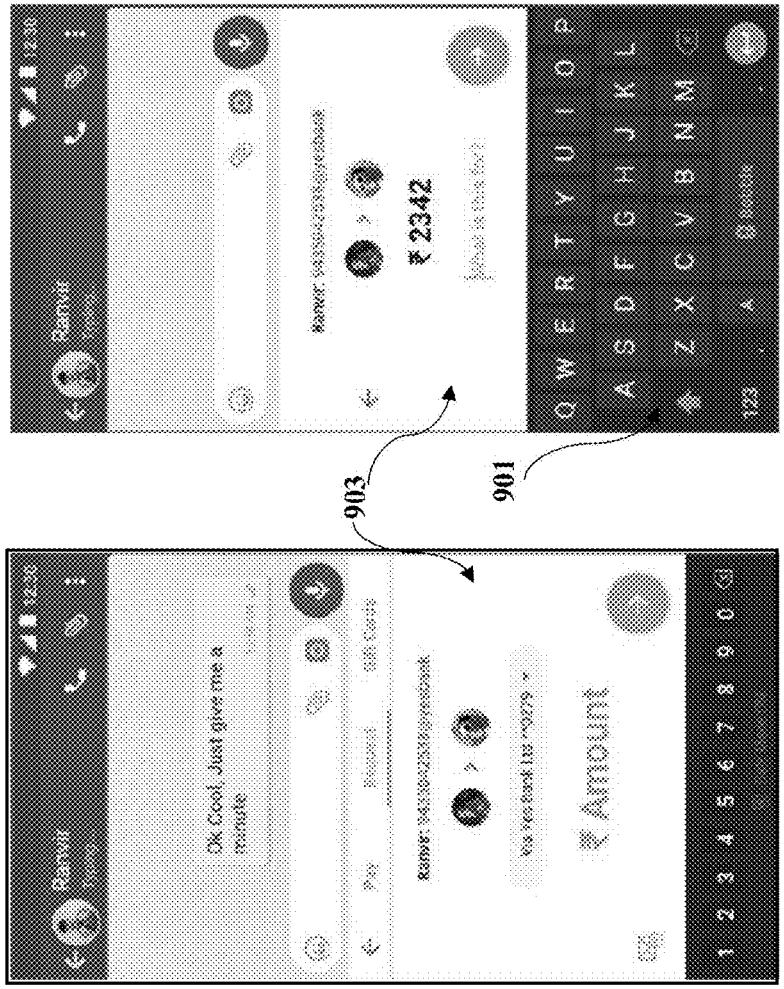
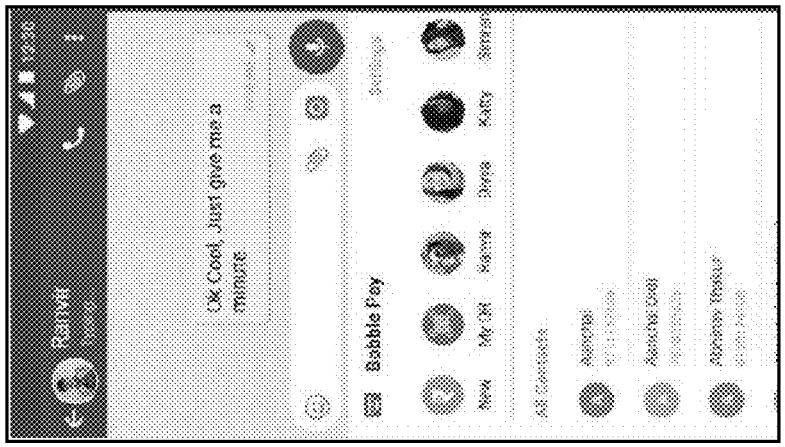
FIG. 12A  FIG. 12B  FIG. 12C

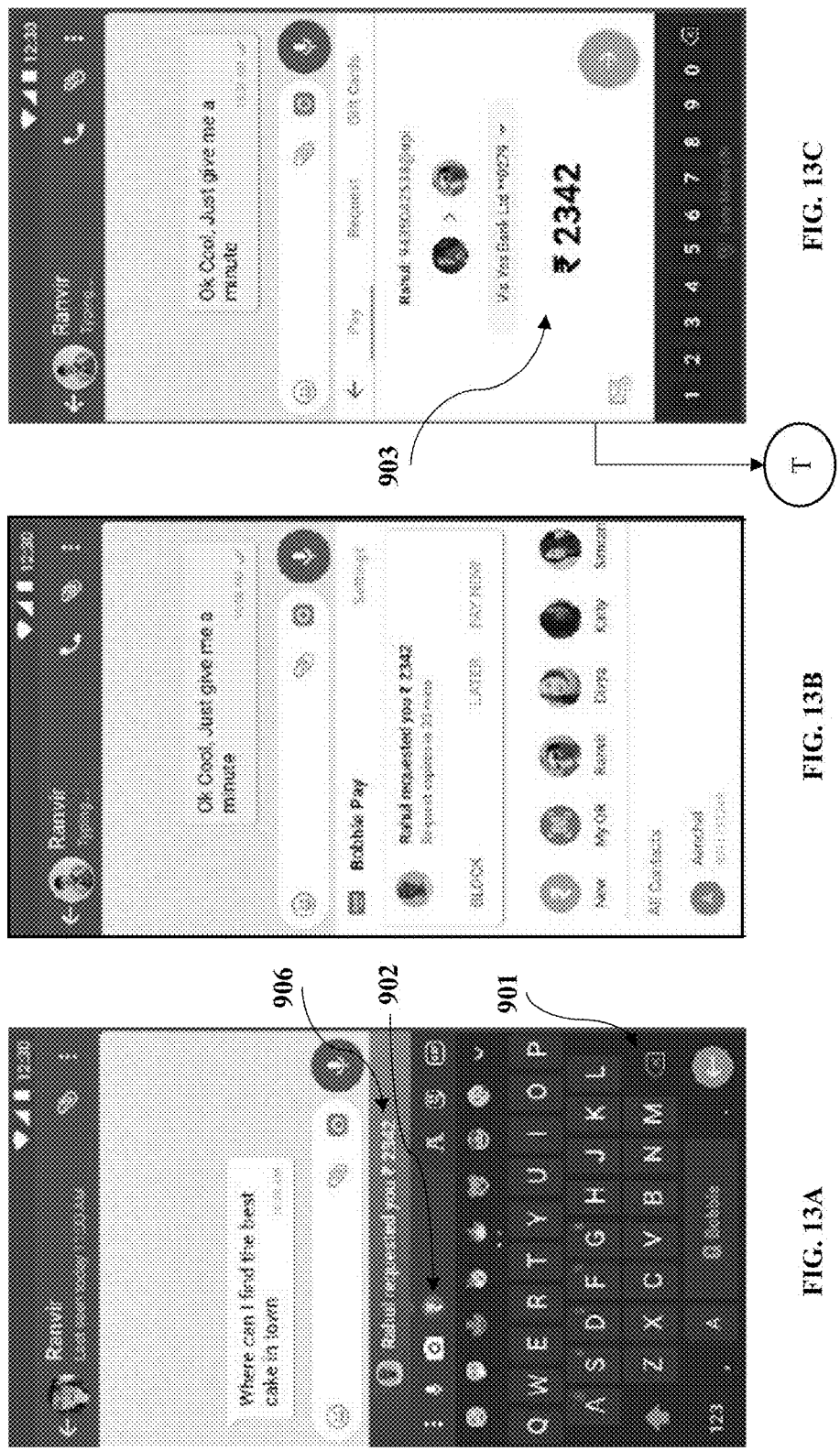

FIG. 13D
FIG. 13E
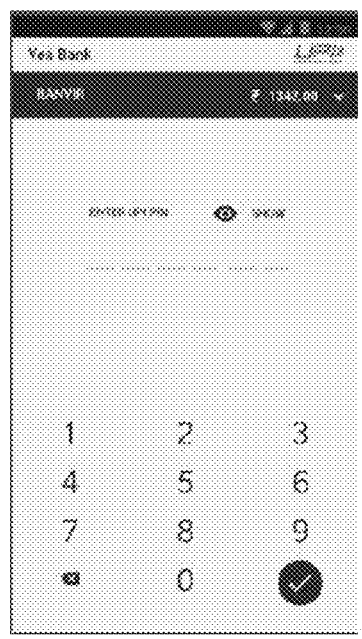
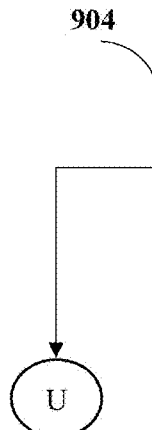
FIG. 13F
FIG. 13G

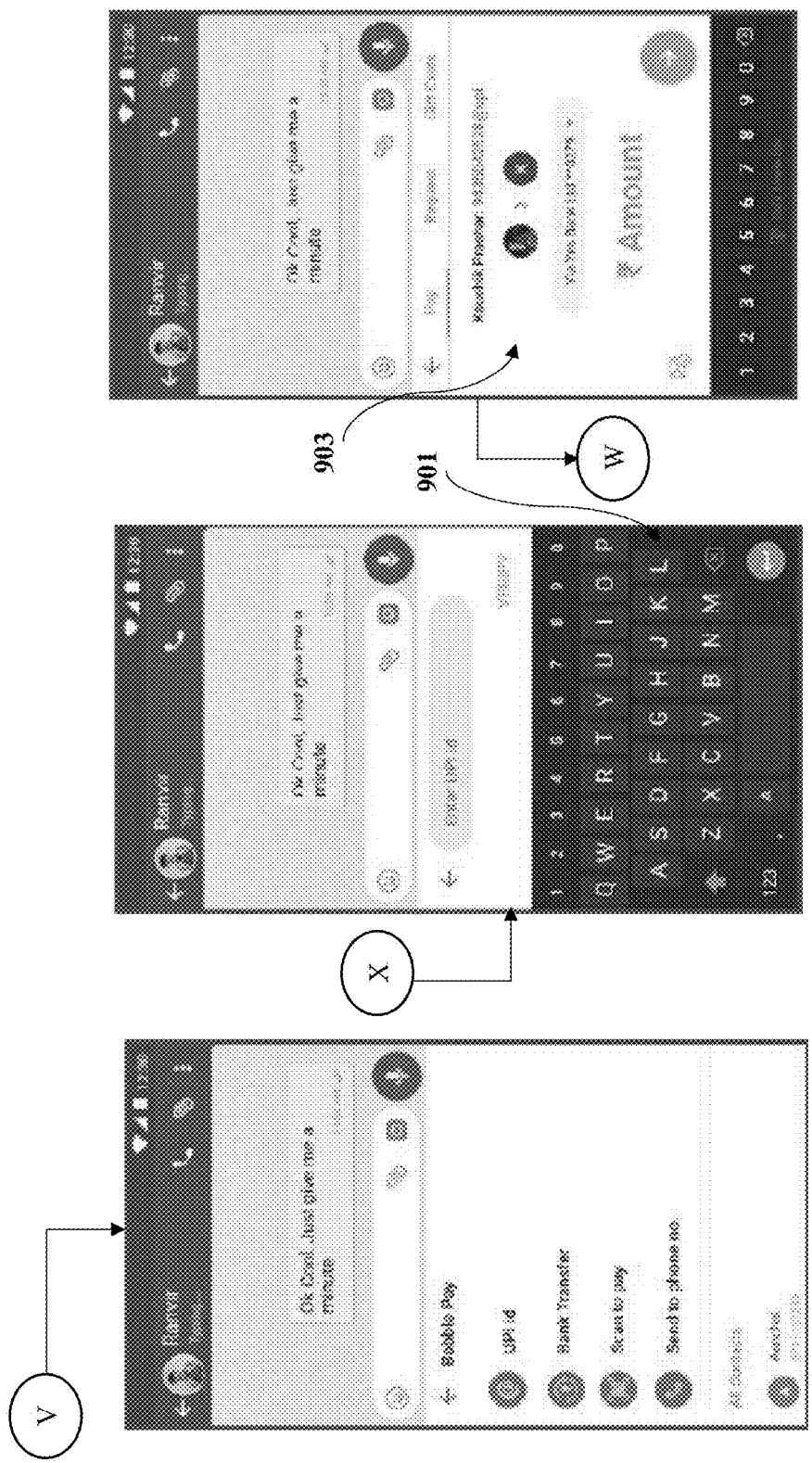

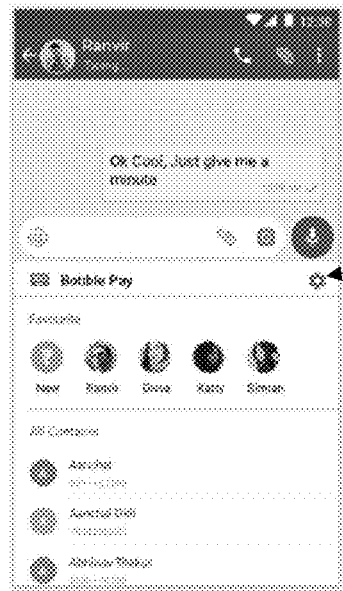
FIG. 15A  FIG. 15B
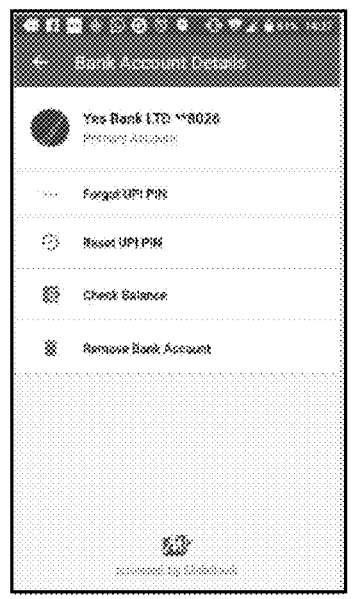
FIG. 15C  FIG. 15D

INTEGRATED PAYMENT SYSTEM AND METHOD FOR MANAGING PAYMENT TRANSACTIONS WITHIN AN INPUT INTERFACE

CROSS-REFERENCE TO RELATED APPLICATIONS

This application claims priority to and the benefit of the non-provisional patent application titled "Integrated Payment System and Method for Managing Payment Transactions Within an Input Interface", application number 202011039211, filed in the Indian Patent Office on Sep. 10, 2020. The specification of the above referenced patent application is incorporated herein by reference in its entirety.

BACKGROUND

Technical Field

The embodiments disclosed herein, in general, relates to mobile payment and transaction processing. More particularly, the embodiments herein relate to an integrated payment system and method and specifically to a platform for managing payment transactions within an input interface, for example, a keyboard, invoked on a user device.

Description of the Related Art

Different forms of communication and managing transactions have emerged through social and digital media platforms. Some platforms allow secure transactions, for example, payment transactions, to be performed between users through a user application, for example, a messaging application or a chat application. However, users of these platforms are typically required to maintain an account with each platform to execute these secure transactions. For executing any transaction, users, typically, have to undergo a transaction process that requires each user to access an external application (app) or a website provided by banks. When users chat with each other using a chat application and if one user, herein referred to as a "sender", wants to send a payment to the user, herein referred to as a "recipient", with whom the sender is chatting, the sender typically has to exit the chat application and navigate to another payment application external to the chat application and then has to enter an identifier, for example, an account number, or a unified payments interface (UPI) identifier (ID), or a transaction address into preconfigured fields of the payment application for executing and confirming the payment transaction. Exiting one application to access another application to perform a separate transaction requires a significant amount of effort from the users and is, therefore, burdensome and inconvenient to the users.

Hence, there is a long-felt need for an integrated payment system and a method for managing payment transactions within an input interface, for example, a keyboard, invoked on a user device, where the integrated payment system is independent of a user application, but accessible during usage of the user application, thereby allowing users to continue using the user application while performing payment transactions.

OBJECTS OF THE EMBODIMENTS HEREIN

An object of the embodiments herein is to develop an integrated payment system and a method for managing payment transactions within an input interface, for example, a keyboard, invoked on a user device.

Another object of the embodiments herein is to integrate a payment system within the input interface invoked on a user device, independent of a user application.

Yet another object of the embodiments herein is to allow access of the integrated payment system from within the input interface during usage of the user application, thereby allowing users to continue using the user application while performing payment transactions through the integrated payment system.

Yet another object of the embodiments herein is to automatically detect a recipient for a payment transaction during an interaction between a sender and the recipient through the user application.

Yet another object of the embodiments herein is to automatically determine an identifier of the detected recipient and account information linked to the identifier of the detected recipient.

Yet another object of the embodiments herein is to generate and render transaction information, for example, receipts, payment confirmations, notifications, prompts, etc., within the input interface for convenient access by the users.

Yet another object of the embodiments herein is to implement build-in receipt generation, transaction history access, and support from within the input interface.

Yet another object of the embodiments herein is to implement built-in notification and prompts for notifications related to payment transactions.

Yet another object of the embodiments herein is to provide access to a payment gateway, for example, a unified payments interface (UPI) from within the input interface and allow execution of payment gateway transactions, for example, UPI transactions from within the input interface.

Yet another object of the embodiments herein is to execute transaction management operations and account setup operations from within the input interface.

Yet another object of the embodiments herein is to determine a context of the interaction between the users and render a notification of payment options available to the users within the input interface.

Yet another object of the embodiments herein is to directly send, on receiving a confirmation from the sender, the transaction information to the recipient by a programmatic simulation of an action key press, thereby directly sending the transaction information to the recipient free of a manual user input action, if the users are interacting within a graphical user interface (GUI) of the user application.

The objects disclosed above will be realized and achieved at least by the elements, features, and combinations particularly pointed out in the detailed description of the embodiments herein. The objects disclosed above have outlined, rather broadly, the features of the embodiments herein in order that the detailed description that follows may be better understood. The objects disclosed above are not intended to determine the scope of the claimed subject matter and are not to be construed as limiting of the embodiments herein. Additional objects, features, and advantages of the embodiments herein are disclosed below. The objects disclosed above, which are believed to be characteristic of the embodiments herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The embodiments herein address the above-recited need for an integrated payment system and a method for managing payment transactions within an input interface, for example, a keyboard, invoked on a user device, where the integrated payment system is independent of a user application, but accessible during usage of the user application, thereby allowing users to continue using the user application while performing payment transactions. The embodiments herein employ an integrated payment system executable by at least one processor configured to execute computer program instructions for managing payment transactions within the input interface invoked on the user device.

The system and method disclosed herein describes an integrated payment system, the system comprising a memory and a processor operatively coupled to the memory. The processor is configured to present a payment interface element at an input interface of a messaging application on a user device, receive a selection of the payment interface element, wherein the payment interface element on the input interface of the user device executes independently of the messaging application, detect a recipient for a payment transaction during an interaction between at least two user devices through the messaging application based on the selection of the payment interface element, present an identifier corresponding to the detected recipient, wherein the identifier represents account information of the recipient, and execute a payment transaction between the user device and the recipient based on the identifier.

In the method disclosed herein, a payment system is integrated within the input interface invoked on the user device, independent of a user application, for example, a messaging or messenger application, a chat application, etc. The integrated payment system renders a payment interface element of the integrated payment system on the input interface. In response to a user input action, for example, a click action, on the payment interface element, the integrated payment system automatically detects a recipient for a payment transaction during an interaction between users, for example, a sender and the recipient, through the user application. The integrated payment system automatically determines an identifier of the detected recipient and account information linked to the identifier of the detected recipient. The integrated payment system executes the payment transaction between the sender and the recipient using the identifier and/or the account information linked to the identifier.

The integrated payment system generates and renders transaction information within the input interface for convenient access by the users. The transaction information comprises a receipt sharable through the user application, history of receipts, etc., accessible from within the input interface. In an embodiment, the integrated payment system renders the transaction information to the input interface, for example, in the form of a prompt and/or a notification. In an embodiment, the rendering of the transaction information comprises directly sending, on receiving a confirmation from the sender, the transaction information to the recipient by a programmatic simulation of an action key press, thereby directly sending the transaction information to the recipient free of a manual user input action, if the users are interacting within a graphical user interface (GUI) of the user application.

In an embodiment, the integrated payment system provides access to a payment gateway, for example, a unified payments interface (UPI) from within the input interface invoked on the user device and links the identifier of the detected recipient to the payment gateway from within the input interface. In an embodiment, the integrated payment system executes transaction management operations from within the input interface. The transaction management operations comprise, for example, account setup operations, payment transfer operations, payment collection operations, invitations, support operations via a support interface, balance enquiry handling operations, etc. In an embodiment, the integrated payment system determines a context of the interaction between the users and renders a notification of payment options available to the users within the input interface, on at least one of the input interface and the GUI of the user application.

The embodiments herein automatically identify the recipient with whom the sender is communicating, identifies bank accounts or UPI accounts linked to an account number, a phone number, or other identifier of the recipient, and proceeds with execution of payment transactions from within the input interface. Also, if a bank account or a UPI account is not connected or linked to the input interface, the embodiments herein execute the complete process of linking directly from within the input interface, thereby precluding a requirement for switching between applications on the user device to perform basic account setup operations and making the linking process more convenient for the user.

In one or more embodiments, related systems comprise circuitry and/or programming for effecting the embodiments herein. In an embodiment, the circuitry and/or programming are any combination of hardware, software, and/or firmware configured to implement the embodiments herein depending upon the design choices of a system designer. Also, in an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments herein are shown in the drawings. However, the embodiments herein are not limited to the specific methods and components disclosed herein. The description of a method step or a component referenced by a numeral in a drawing is applicable to the description of that method step or component shown by that same numeral in any subsequent drawing herein.

FIGS. 10A-10L exemplarily illustrate interfaces rendered on a user device during execution of a peer-to-peer send payment transaction when an identifier of a recipient is not detected, according to an embodiment of the embodiments herein.

FIGS. 12A-12F exemplarily illustrate interfaces rendered on a user device during execution of a peer-to-peer collect payment transaction when a payment request is sent, according to an embodiment of the embodiments herein.

FIGS. 13A-13K exemplarily illustrate interfaces rendered on a user device during execution of a peer-to-peer collect payment transaction when a payment request is received, according to an embodiment of the embodiments herein.

FIGS. 15A-15D exemplarily illustrate interfaces rendered on a user device for executing transaction management operations, according to an embodiment of the embodiments herein.

DETAILED DESCRIPTION

Figure 1:
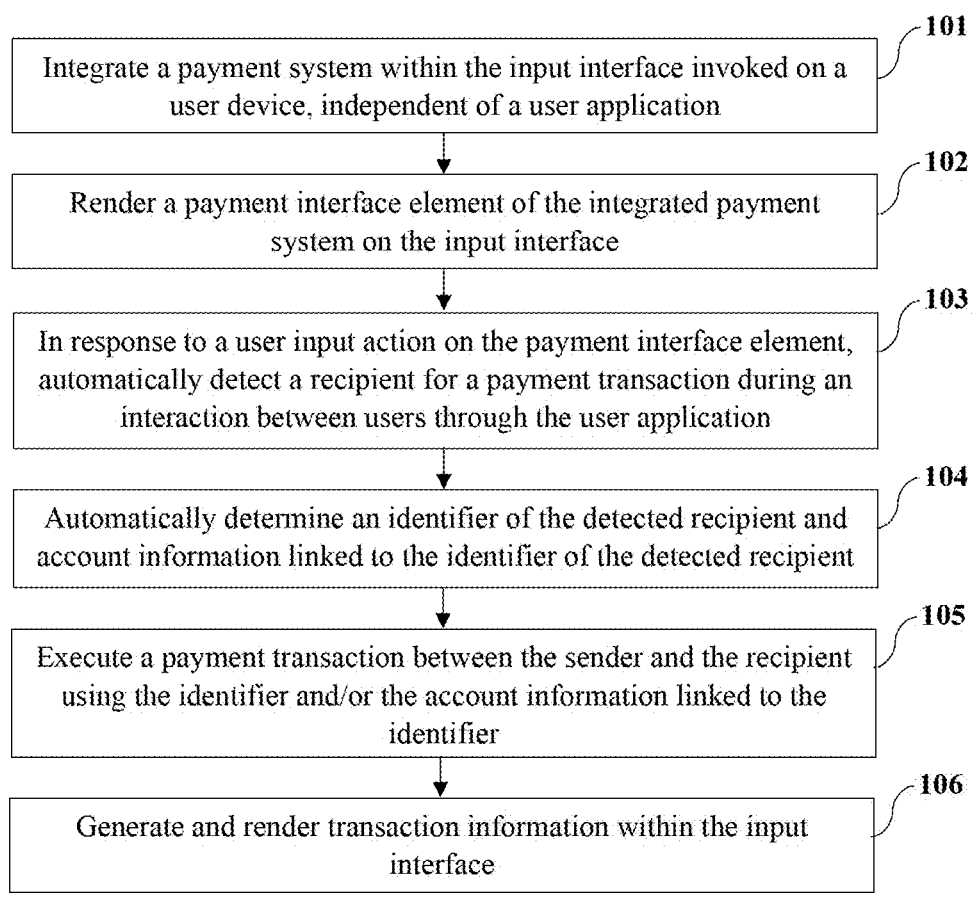
FIG. 1 illustrates a flowchart of a method for managing payment transactions within an input interface, according to an embodiment of the embodiments herein.

FIG. 1 illustrates a flowchart of a method for managing payment transactions within an input interface, according to an embodiment of the embodiments herein. As used herein, "input interface" refers to an interface rendered on a user device, for example, a smartphone, for receiving one or more inputs from a user. For example, the input interface is a keyboard or a virtual keyboard that is invoked on the user device when a user clicks on an input field such as a text field provided by a user application such as a messaging application or a chat application. In another example, the input interface is a browser interface deployed on a browser application. In the method disclosed herein, a payment system is integrated 101 within the input interface invoked on the user device, independent of a user application, for example, a messaging or messenger application, a chat application, etc. As the input interface such as a virtual keyboard is opened and closed only during an input action into an input field of the user application, the operations and functions of the integrated payment system are configured to be independent of the user application or any application that is present in the foreground. In an embodiment, the integrated payment system is installed as an application (app) that is accessible from within the input interface on the user device.

The integrated payment system renders 102 a payment interface element, for example, a currency icon, of the integrated payment system on the input interface. In response to a user input action, for example, a click action, on the payment interface element, the integrated payment system automatically detects 103 a recipient for a payment transaction during an interaction between users, for example, a sender and the recipient, through the user application and selects the detected recipient by default. The integrated payment system communicates with the user application to detect the recipient. The integrated payment system automatically determines 104 an identifier of the detected recipient and account information linked to the identifier of the detected recipient. The identifier is, for example, a phone number, an account number, a payment gateway identifier such as a unified payments interface (UPI) identifier (ID), a transaction address, etc. The integrated payment system implements the method of detecting a phone number and the other user with whom the user is chatting from within the input interface when the input interface is linked or branded by any bank or wallet-based company and accessibility is available on the user device. For example, on a user device with an Android operating system, the integrated payment system obtains content of a screen, for example, a phone number, a name of the person with whom the user is chatting, etc., through an accessibility application programming interface (API). If there is a name, the integrated payment system matches and compares the name with a contact list on a subscriber identification module (SIM) or the user device to obtain the phone number of the other user with whom the user is chatting. This accessibility feature is available only if the user has enabled the accessibility feature for usage with the input interface. The integrated payment system sends an API request with the phone number to a database of a bank to determine a linked UPI address or bank details for the detected phone number. Bank APIs provide access to the database of accounts linked to a phone number. The bank sends an API response with the UPI address or the bank details associated with the user's phone number if the user has an account in that particular bank.

The integrated payment system executes 105 the payment transaction between the sender and the detected recipient using the identifier and/or the account information linked to the identifier. The integrated payment system employs the user application only to automatically detect the recipient with whom the sender communicates and determine the linked account, for example, a bank account or a UPI account of the recipient. In an embodiment, a user is required to set permissions in the input interface that allow the integrated payment system in the input interface to access the identifier of the recipient and the account information linked to the identifier. The integrated payment system can be linked to any bank account. The integrated payment system integrated within other input interfaces, for example, browser interfaces, allows users to perform transactions with other users through the browser interfaces.

The integrated payment system generates and renders 106 transaction information within the input interface for convenient access by the users. The transaction information comprises a receipt sharable through the user application, history of receipts, etc., accessible from within the input interface. In an embodiment, the integrated payment system renders the transaction information to the input interface, for example, in the form of a prompt and/or a notification. In an embodiment, the rendering of the transaction information comprises directly sending, on receiving a confirmation from the sender, the transaction information to the recipient by a programmatic simulation of an action key press, thereby directly sending the transaction information to the recipient free of a manual user input action, if the users are interacting within a graphical user interface (GUI) of the user application. In this embodiment, the integrated payment system directly sends receipts, transaction details or payment requisition text messages with links therein, when accessibility is available and the integrated payment system has detected the recipient from a current chat screen to maintain confidentiality of secure information.

In an embodiment, the integrated payment system provides access to the UPI from within the input interface invoked on the user device and links the identifier of the detected recipient to the UPI from within the input interface. In an embodiment, the integrated payment system executes transaction management operations from within the input interface. The transaction management operations comprise, for example, account setup operations, payment transfer operations, payment collection operations, invitations, support operations via a support interface, balance enquiry handling operations, etc. In an embodiment, the integrated payment system determines a context of the interaction between the users and renders a notification of payment options available to the users within the input interface, on at least one of the input interface and the GUI of the user application. The integrated payment system generates and renders prompts regarding the context of a current communication or chat between users. If the context is related to payments or finance, the integrated payment system detects the context in real time and provides a prompt within the input interface from which the users may access payment screens. In an embodiment, the integrated payment system highlights the payment interface element, for example, the pay icon, on a bar just above the main view of the input interface to emphasize the payment features.

The integrated payment system automatically identifies the recipient with whom the sender is communicating, identifies bank accounts or UPI accounts linked to an account number, a phone number, or other identifier of the recipient, and proceeds with execution of payment transactions from within the input interface. Also, if a bank account or a UPI account is not connected or linked to the input interface, the integrated payment system executes the complete process of linking directly from within the input interface, thereby precluding a requirement for switching between applications on the user device to perform basic account setup operations and making the linking process more convenient for the user.

Figure 2:
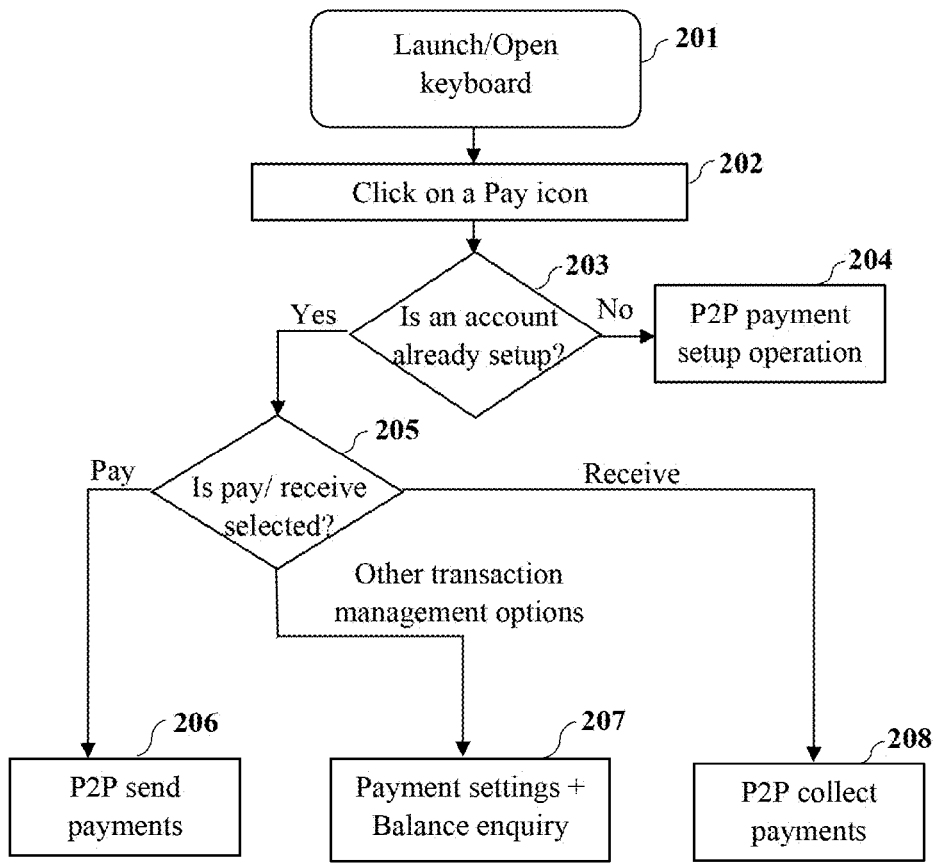
FIG. 2 illustrates a flowchart of a method for managing payment transactions within a keyboard, according to an embodiment of the embodiments herein.

FIG. 2 illustrates a flowchart of a method for managing payment transactions within an input interface, for example, a keyboard, according to an embodiment of the embodiments herein. For purposes of illustration, the detailed description refers to the integration of the payment system into a keyboard; however, the scope of the method and the system disclosed herein is not limited to the integration of the payment system into a keyboard, but may be extended to include integration of the payment system into any input interface, for example, a browser interface or any functionally equivalent input interface. Consider an example where a user, User X, deploys the integrated payment system in the keyboard that can be invoked on the user device for managing payment transactions within the input interface. User X invokes a user application, for example, a chat application, on the user device for communicating with a user, User Y. The user application renders an input field on a graphical user interface (GUI) of the user application that allows User X to enter a message therewithin. When User X performs an input action, for example, a click action, in the input field, the input field is focused and the keyboard is opened or launched 201. The integrated payment system renders a payment interface element, for example, a pay icon or a currency icon on a top row of the keyboard. When User X taps or clicks 202 the pay icon, the integrated payment system renders transaction management options, for example, a pay option, a receive payment option, a payment settings option, a balance enquiry option, etc., on the keyboard. The integrated payment system determines 203 whether User X has setup an account in the integrated payment system. If User X has not setup an account in the integrated payment system, the integrated payment system executes an account setup operation 204 as disclosed in the detailed description of FIG. 3, for setting up an account for peer-to-peer (P2P) transactions. If User X has created and setup account information in the integrated payment system, the integrated payment system determines 205 whether User X selected the pay option or the receive payment option on the keyboard. If User X selected the pay option, the integrated payment system executes 206 a P2P send payment transaction as disclosed in the detailed description of FIG. 4. If User X selected other transaction management options, for example, a payment settings option and/or a balance enquiry option, the integrated payment system executes 207 transaction management operations, for example, payment settings, balance enquiry handling operations, etc., as disclosed in the detailed description of FIG. 5. If User X selected the receive payment option, the integrated payment system executes 208 a P2P collect payment transaction as disclosed in the detailed description of FIG. 6.

To execute the transaction management operations disclosed above, the integrated payment system automatically detects User Y as a recipient for a payment transaction. In an embodiment, the integrated payment system allows User X to select User Y or another contact from a contact list displayed in the keyboard as a recipient for initiating a payment transaction. The integrated payment system automatically determines an identifier of the selected contact and account information linked to the identifier of the selected contact. For example, the integrated payment system automatically determines a phone number of the selected contact and a unified payments interface (UPI) identifier (ID) of the selected contact linked to the phone number. The integrated payment system validates the UPI ID of the selected contact based on the phone number. The integrated payment system also validates UPI IDs, for example, username@handle, based on the phone number. Upon validation, the integrated payment system then executes a payment transaction between User X and the selected contact using the phone number and/or the UPI ID.

Figure 3:
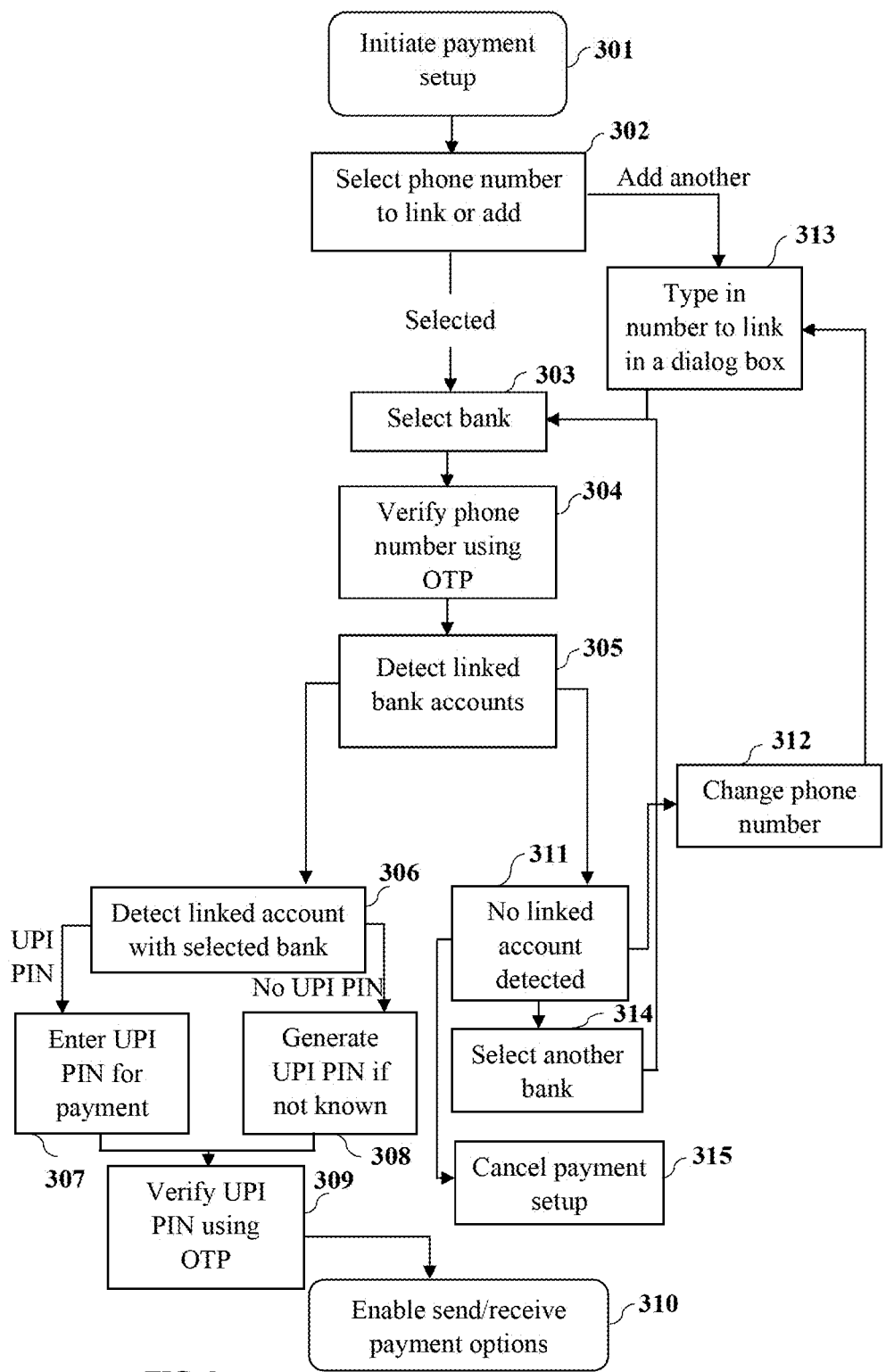
FIG. 3 illustrates a flowchart of a method for executing an account setup operation, according to an embodiment of the embodiments herein.

FIG. 3 illustrates a flowchart of a method for executing an account setup operation, according to an embodiment of the embodiments herein. The integrated payment system allows a user to initiate 301 an account setup operation and set up an account through the input interface, for example, the keyboard, invoked on the user device. On initiating the account setup operation, the integrated payment system displays a screen with an option to proceed with account creation. The user may click on the option to create an account. The integrated payment system allows the user to select 302 a phone number associated with an account of the integrated payment system. If a user device contains more than one subscriber identification module (SIM), the integrated payment system allows the user to select a phone number from among the phone numbers associated with the SIM cards deployed on the user device. The integrated payment system also allows the user to add a phone number via a graphical control element, for example, a dialog box, rendered on the screen.

The integrated payment system then allows the user to select 303 a bank to which the selected phone number is linked for payment transactions, for example, unified payments interface (UPI) payments. The integrated payment system verifies 304 the selected phone number, for example, using a one-time password (OTP), for security and reduction of spams in linking procedures. The integrated payment system employs APIs of banks for detecting 305 a bank account linked to the selected phone number. If the integrated payment system does not 311 detect a linked bank account, the integrated payment system displays a screen with options that allow the user, for example, to change 312 the phone number, select 314 another bank that links to the selected phone number, and cancel 315 the account setup. If the user wants to change the phone number for payment only, the integrated payment system allows the user to add 313 a phone number by entering the phone number in a field provided in the dialog box. If the user cancels the account setup completely, on the next click of the payment interface element, for example, the pay icon, displayed on a top row of the keyboard, the integrated payment system restarts the account setup operation.

If the integrated payment system detects 306 a linked bank account, the integrated payment system displays a screen for setting up a personal identification number (PIN), for example, a UPI PIN for a fast transaction. If the user knows the UPI PIN to the linked bank account, the integrated payment system enters 307 the UPI PIN on the screen and proceeds to a verification screen that requests for an OTP. If the user does not know the UPI PIN, the integrated payment system allows the user to generate 308 a new UPI PIN on the screen. The integrated payment system verifies 309 the UPI PIN that is either set up or generated using the OTP. After completing the account setup operation, in an embodiment, the integrated payment system allows users to send or receive 310 payments by clicking the pay icon displayed on the top row of the keyboard.

Figure 4:
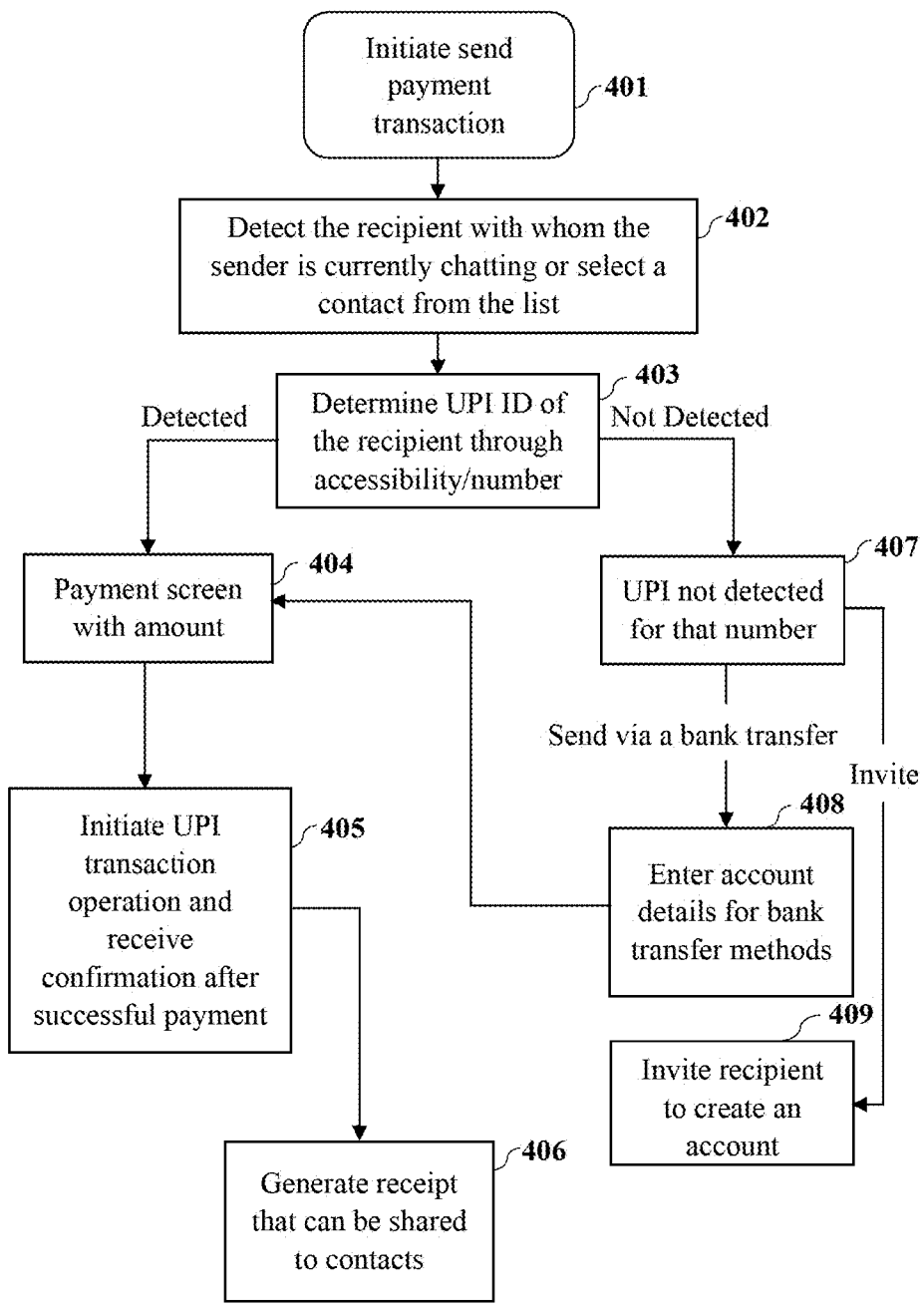
FIG. 4 illustrates a flowchart of a method for executing a peer-to-peer send payment transaction, according to an embodiment of the embodiments herein.

FIG. 4 illustrates a flowchart of a method for executing a peer-to-peer (P2P) send payment transaction, according to an embodiment of the embodiments herein. If the user, herein referred to as a "sender", initiates 401 a send payment transaction by selecting the send payment or pay option provided by the integrated payment system in the keyboard, the integrated payment system automatically detects 402 the recipient, that is, the user with whom the sender is chatting through the user application or, in an embodiment, allows the sender to select 402 one of the sender's phone contacts as the recipient to whom to send a payment. The integrated payment system determines the phone number of the recipient. The integrated payment system automatically determines 403 an identifier, for example, a unified payments interface (UPI) identifier (ID) of the recipient through the phone number of the recipient and validates the UPI ID based on the phone number. In an embodiment, the integrated payment system validates UPI IDs, for example, username@handle, based on the recipient's phone number. After validation, the sender enters a payment amount and remarks on a payment screen 404 rendered by the integrated payment system and proceeds.

If the integrated payment system detects a virtual payment address (VPA) of the recipient, the integrated payment system initiates 405 a UPI transaction operation where the sender enters a PIN and verifies the transaction. On successful payment, the integrated payment system generates 406 and renders a receipt of the payment transaction from the keyboard itself and allows the sender to share the receipt, for example, in a textual format and/or a graphical format with the recipient or any other user by selecting the user from a contact selector. If the integrated payment system does not detect 407 the VPA of the recipient, the integrated payment system provides the sender with an option to enter the UPI ID or the VPA manually or send the payment via a bank transfer, for example, via a national electronic funds transfer (NEFT). If the sender chooses to send the payment via a bank transfer, the integrated payment system allows the sender to add or enter 408 account information for a bank transfer on the payment screen 404. In an embodiment, the integrated payment system provides an option to invite 409 a contact, for example, the recipient, to create an account using a link provided by the keyboard in an invitation message.

Figure 5:
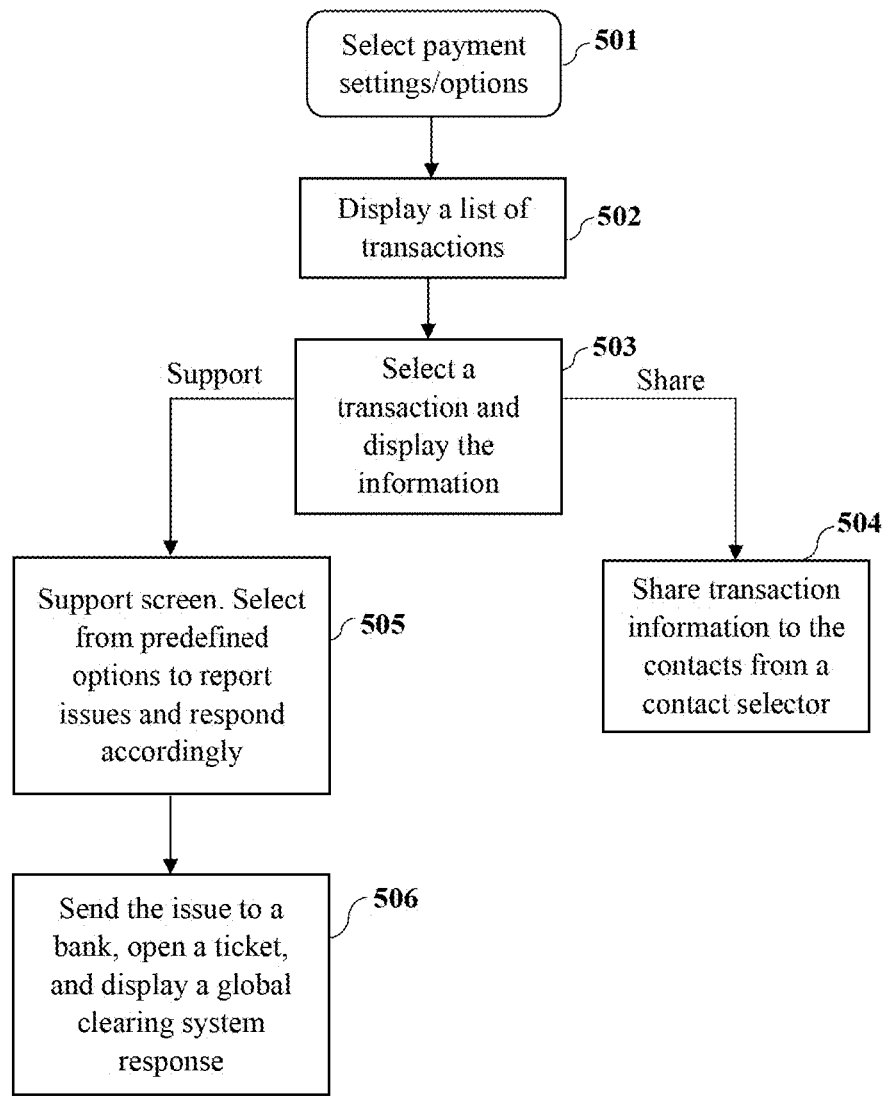
FIG. 5 illustrates a flowchart of a method for executing transaction management operations, according to an embodiment of the embodiments herein.

FIG. 5 illustrates a flowchart of a method for executing transaction management operations, according to an embodiment of the embodiments herein. The integrated payment system provides access to transaction management options, for example, payment settings, from inside the keyboard. In an embodiment, a user may access the transaction management options, for example, payment settings, through a keyboard settings screen on the user device. When the user selects 501 the payment settings options or other transaction management options, the integrated payment system displays 502 a list of transactions on a screen. The integrated payment system displays the user's name, an identifier linked to an account, for example, the unified payments interface (UPI) identifier (ID), which can be copied to a clipboard, a display image from the keyboard settings screen, payment history such as last two transactions with an option to view all the transactions, a linked bank account, an option to check balance, an option to add a new account, etc. When the user selects the option to view all the transactions, the integrated payment system displays a list of previous transactions.

When the user selects a transaction on the screen, the integrated payment system displays 503 the payment transaction information of the selected transaction on the screen. In an embodiment, the integrated payment system provides an option to contact support for each transaction or share the transaction with contacts. When the user selects the support option, the integrated payment system displays a support screen that allows the user to select 505 an option from a list of predefined options to report issues and provides a response to the selected option. In an embodiment, the integrated payment system responds to each issue with predefined responses. In an embodiment, the integrated payment system allows users to attach files, for example, images, screenshots, etc., and share the files with a bank. The integrated payment system sends 506 the issue to the bank, opens a ticket, and displays a global clearing system (GCS) response on the screen. In an embodiment, the integrated payment system is operably coupled to the GCS and sends a short message service (SMS) message or a notification for the GCS response. The integrated payment system implements deep linking to the support screen. When the user selects the share option, the integrated payment system displays a contact selector to allow the user to select the contact with whom the user wants to share 504 the payment transaction information.

Figure 6:
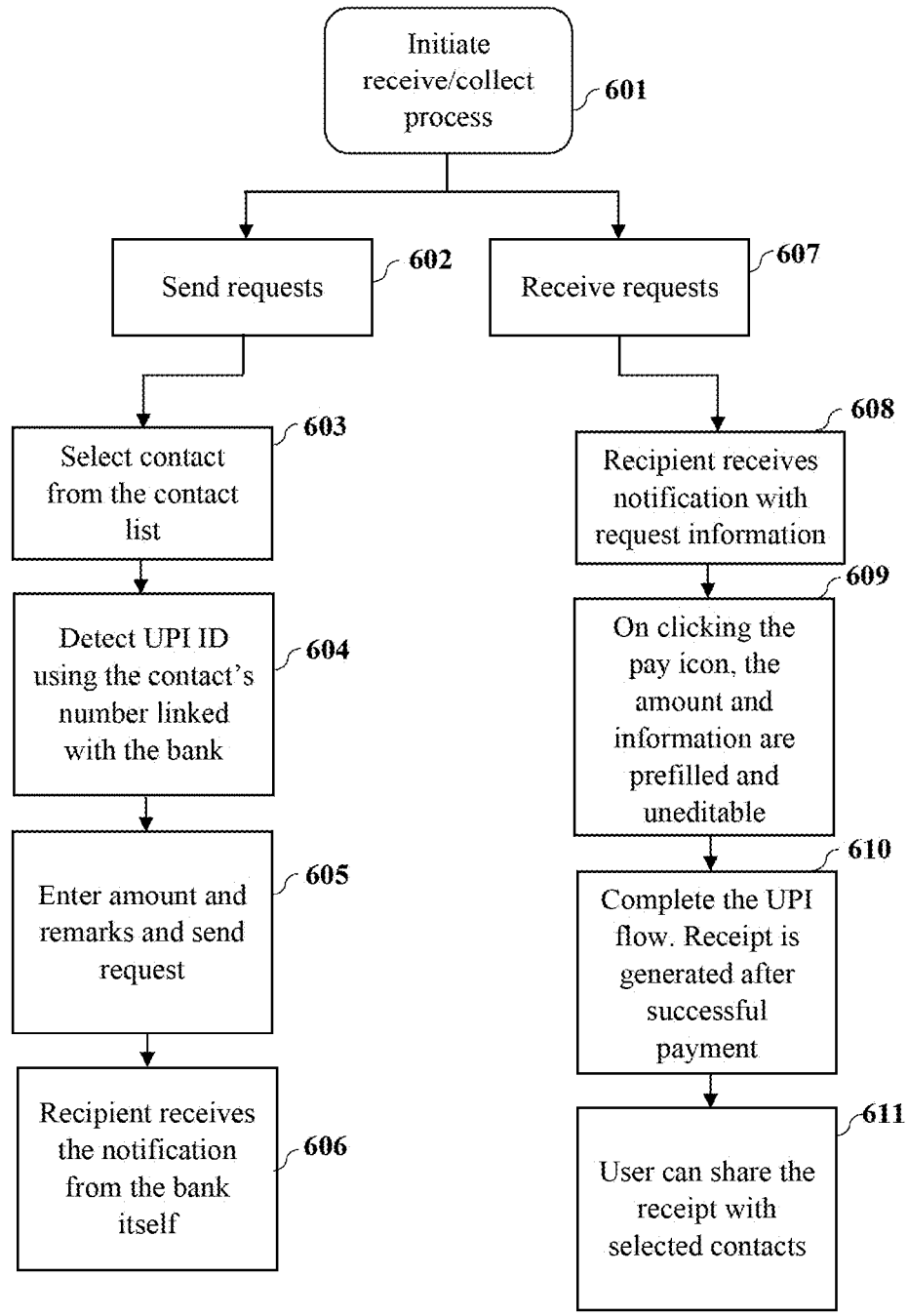
FIG. 6 illustrates a flowchart of a method for executing a peer-to-peer collect payment transaction, according to an embodiment of the embodiments herein.

FIG. 6 illustrates a flowchart of a method for executing a peer-to-peer (P2P) collect payment transaction, according to an embodiment of the embodiments herein. To initiate 601 a receive/collect payment transaction, the integrated payment system allows users to send 602 requests to contacts for payment or receive notifications from within the keyboard for payment requests. For P2P collect payment transactions, the integrated payment system allows a user to access requests by either accessing a request tab displayed in a payments screen in the keyboard or tapping or clicking on a notification prompt of requests for payments rendered on a graphical user interface (GUI) of a user application or on the keyboard.

The integrated payment system allows the user to select an option to send a request for a payment. In an embodiment, the integrated payment system selects 603 a contact from the contact list or from a favourite list of contacts. In another embodiment, the integrated payment system automatically detects the contact with whom the user is chatting through the user application, for sending the request for the payment. The integrated payment system detects 604 an identifier, for example, the unified payments interface (UPI) identifier (ID) using the selected contact's phone number linked with a bank and validates the UPI ID of the selected contact for the bank account based on the phone number of the selected contact. The integrated payment system allows the user to enter 605 the payment amount, remarks, or a message, if any, on the screen, and send the request for the payment. The user then clicks on a proceed icon rendered on the screen to proceed with the next steps. The selected contact, that is, the recipient of the request, receives 606 the notification via the keyboard as a prompt on the pay icon and from the bank. The integrated payment system in the keyboard of the recipient's user device allows the recipient to click on the notification prompt of the keyboard and proceed with the payment via the keyboard. In an embodiment, the integrated payment system displays all the notifications regarding the requests 607 for payment on the request tab. After the recipient receives 608 and accesses the notification prompt for the payment request, the integrated payment system allows the recipient to click on the pay amount in the notification and navigate to a payment screen where the amount and information are prefilled 609 and the recipient may enter remarks but cannot edit the amount of the payment. The integrated payment system allows the recipient to complete 610 the payment, for example, via a UPI gateway, by entering the UPI PIN and completing the payment flow for a successful transaction. On successful completion of the transaction, the integrated payment system generates and renders a payment receipt on the screen which can be shared 611 with the user who requested for the payment or another contact selected via the contact selector.

Figure 7A:
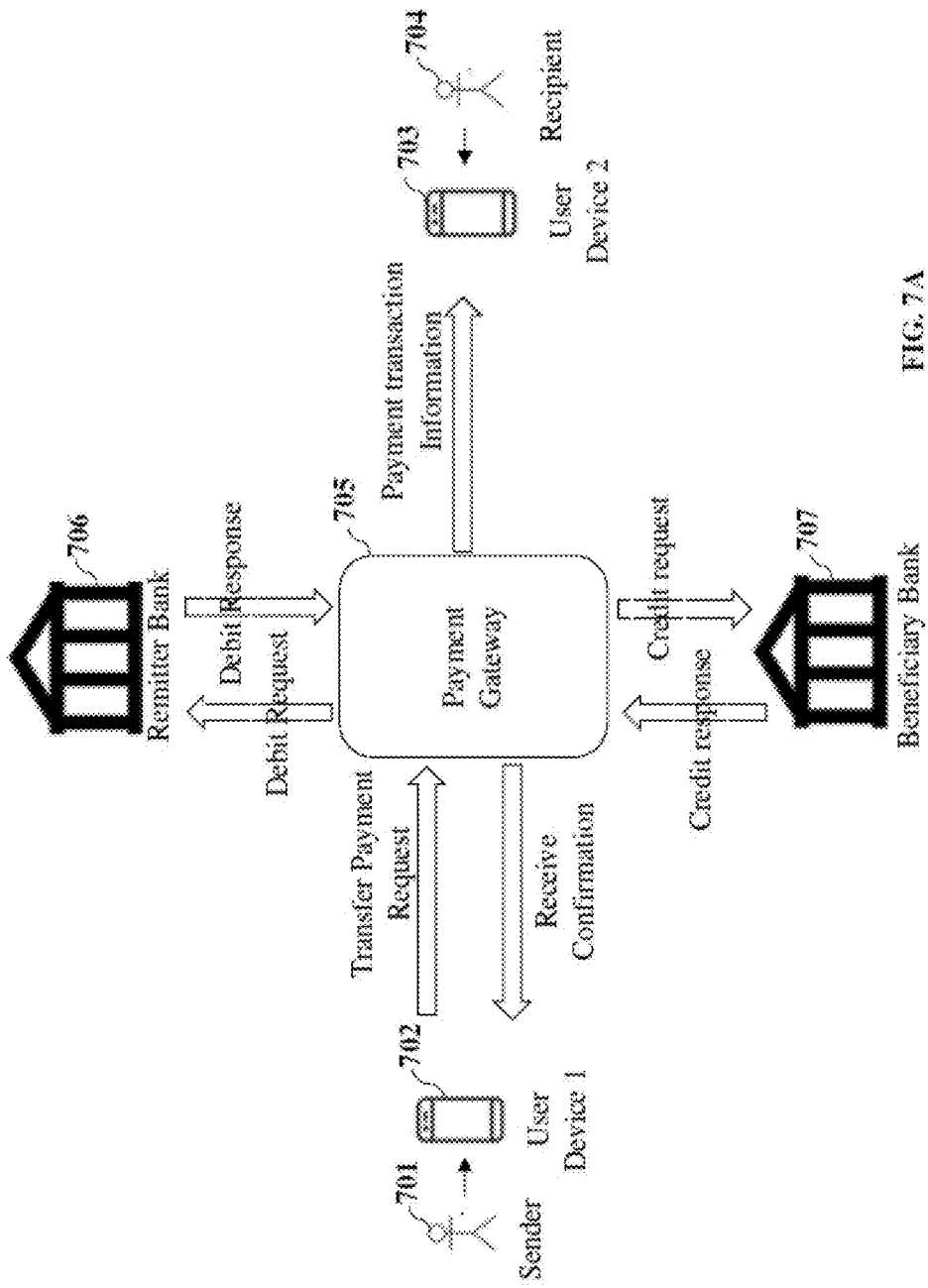
FIG. 7A illustrates a schematic showing execution of a peer-to-peer payment transaction between a sender and a recipient, according to an embodiment of the embodiments herein.

FIG. 7A illustrates a schematic showing execution of a peer-to-peer (P2P) payment transaction between a sender 701 and a recipient 704, according to an embodiment of the embodiments herein. Consider an example where User X initiates a chat conversation with User Y using a user application deployed on a user device 702. During the chat conversation, if User X wants to send a payment to User Y, User X, herein referred to as the sender 701, clicks on a pay icon rendered on an input interface, for example, a keyboard, invoked on the user device 702. Clicking the pay icon provides access to the integrated payment system in the keyboard, through which the P2P payment transaction is triggered. The sender 701 sends a request for the P2P payment transaction to the integrated payment system. The integrated payment system automatically detects User Y, herein referred to as the recipient 704, through the user application and determines the recipient's 704 phone number. Furthermore, the integrated payment system automatically determines an identifier associated with a payment gateway 705, for example, a unified payments interface (UPI) identifier (ID) of the recipient 704 or the recipient's 704 bank account information for a bank transfer. The UPI ID or the bank account information links to the recipient's 704 account held at a beneficiary bank 707.

The sender 701 enters a payment amount on a payment screen rendered by the integrated payment system and sends the transfer payment request to the payment gateway 705. The payment gateway 705 securely communicates with the sender's 701 remitter bank 706 to debit the payment amount from the account of the sender 701 via a debit request-response mechanism. The payment gateway 705 then securely communicates with the recipient's 704 beneficiary bank 707 to credit the payment amount to the account of the recipient 704 via a credit request-response mechanism using the UPI ID of the recipient 704 or the recipient's 704 bank account information. The payment gateway 705 then generates and renders a receipt and a confirmation of the payment transaction to the sender's 701 user device 702. The integrated payment system in the keyboard invoked on the sender's 701 user device 702 allows the sender 701 to share the payment transaction information with the recipient 704 via the payment gateway 705. The payment gateway 705 transmits the payment transaction information to the recipient's 704 user device 703.

Figure 7B:
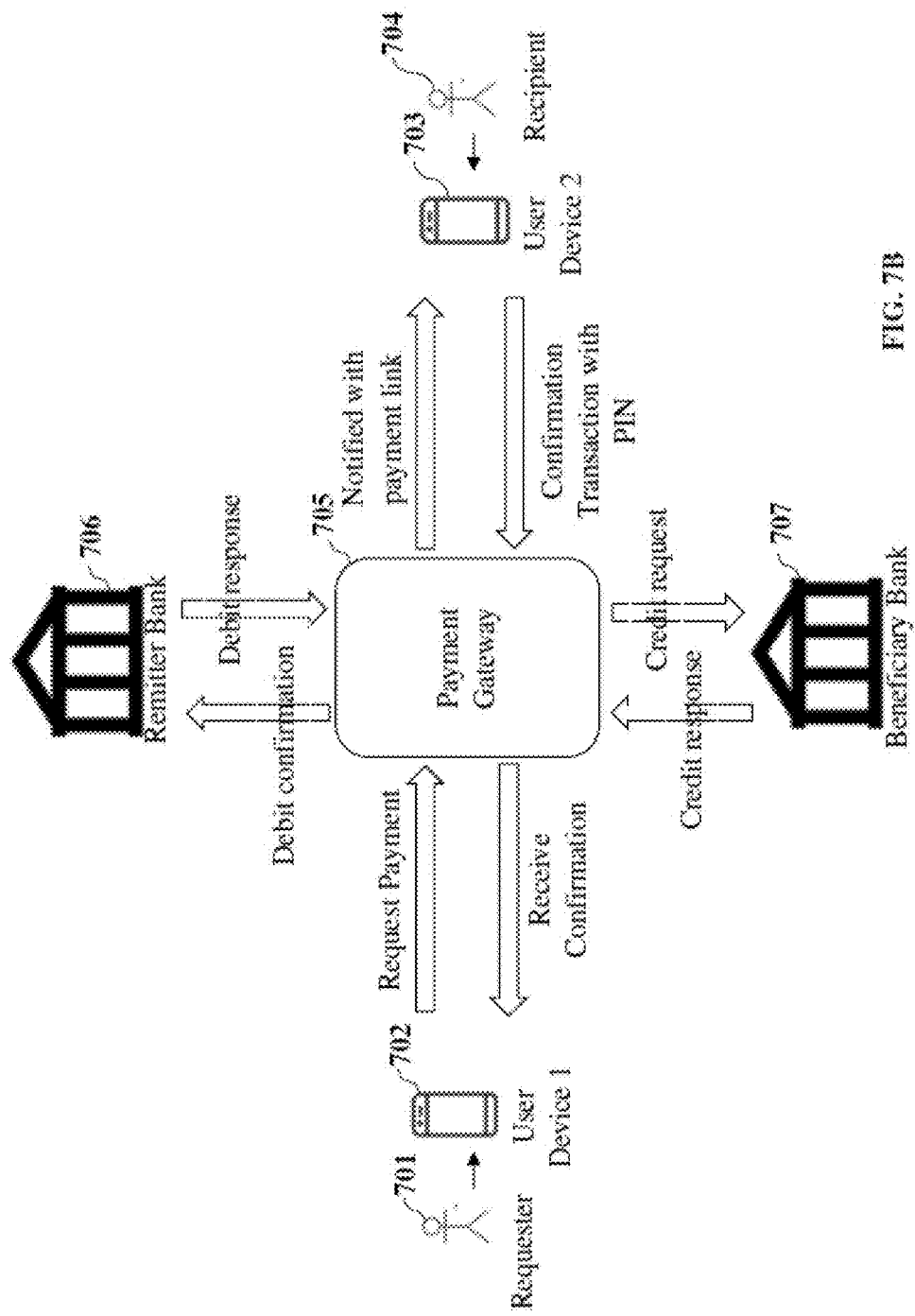
FIG. 7B illustrates a schematic showing execution of a peer-to-peer collect payment transaction between users, according to an embodiment of the embodiments herein.

FIG. 7B illustrates a schematic showing execution of a peer-to-peer (P2P) collect payment transaction between users 701 and 704, according to an embodiment of the embodiments herein. Consider an example where User X initiates a chat conversation with User Y using a user application deployed on a user device 702. During the chat conversation, if User X wants to request for a payment from User Y, User X, herein referred to as the requester 701, clicks on a pay icon rendered on an input interface, for example, a keyboard, invoked on the user device 702. Clicking the pay icon provides access to the integrated payment system in the keyboard, through which the P2P collect payment transaction is triggered. The requester 701 sends a request for the P2P collect payment transaction to the integrated payment system. The integrated payment system automatically detects User Y, herein referred to as the recipient 704, through the user application and determines the recipient's 704 phone number. Furthermore, the integrated payment system automatically determines an identifier associated with a payment gateway 705, for example, a unified payments interface (UPI) identifier (ID) of the recipient 704 or the recipient's 704 bank account information. The UPI ID or the bank account information links to the recipient's 704 account held at a remitter bank 706.

The requester 701 enters a payment amount on a payment screen rendered by the integrated payment system and sends the collect payment request to the payment gateway 705. The payment gateway 705 transmits a notification with a payment link to the recipient's 704 user device 703. The recipient 704 receives the notification with the payment link as a prompt on the graphical user interface (GUI) of the user device 703. The recipient 704 may click on the payment link in the notification to confirm the transaction with a personal identification number (PIN). The payment gateway 705 receives the confirmation of the transaction with the PIN from the user device 703 and securely communicates with the recipient's 704 remitter bank 706 to debit the payment amount from the account of the recipient 704 via a debit request-response mechanism. The payment gateway 705 then securely communicates with the requester's 701 beneficiary bank 707 to credit the payment amount to the account of the requester 701 via a credit request-response mechanism using the UPI ID of the requester 701 or the requester's 701 bank account information. The payment gateway 705 then generates and renders a receipt and a confirmation of the payment transaction to the recipient's 704 user device 703. The integrated payment system in the keyboard invoked on the recipient's 704 user device 703 allows the recipient 704 to share the payment transaction information with the requester 701 via the payment gateway 705. The payment gateway 705 transmits the payment transaction information to the requester's 701 user device 702, whereby the requester 701 receives the confirmation of the payment transaction. In an embodiment, the integrated payment system allows users to request or send payment with a text message in the user application with a link to a payment completion form.

Figure 8A:
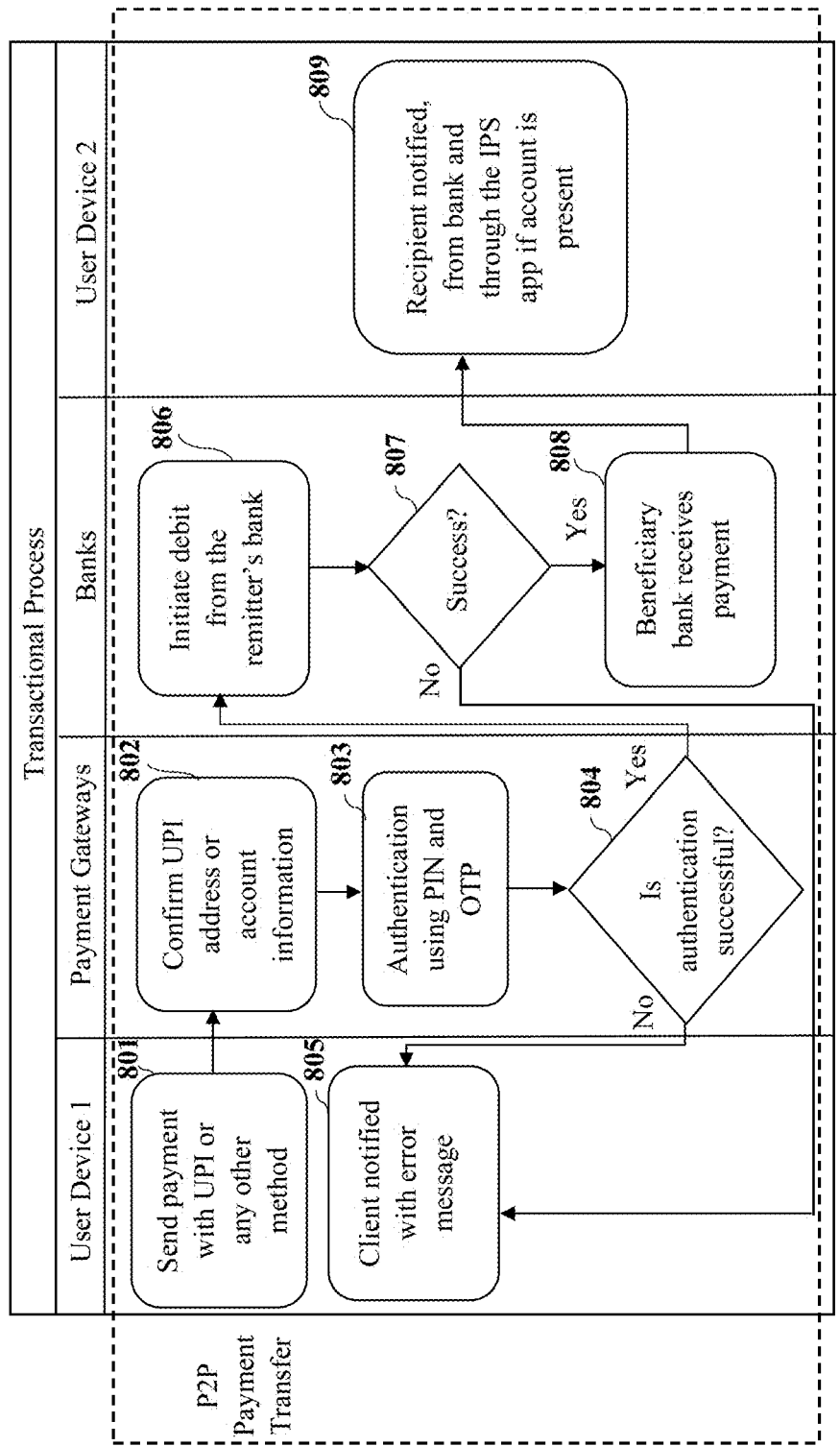
FIGS. 8A-8B illustrate flowcharts comprising transactional processes executed between different components of a system for managing payment transactions within an input interface, according to an embodiment of the embodiments herein.
Figure 8B:
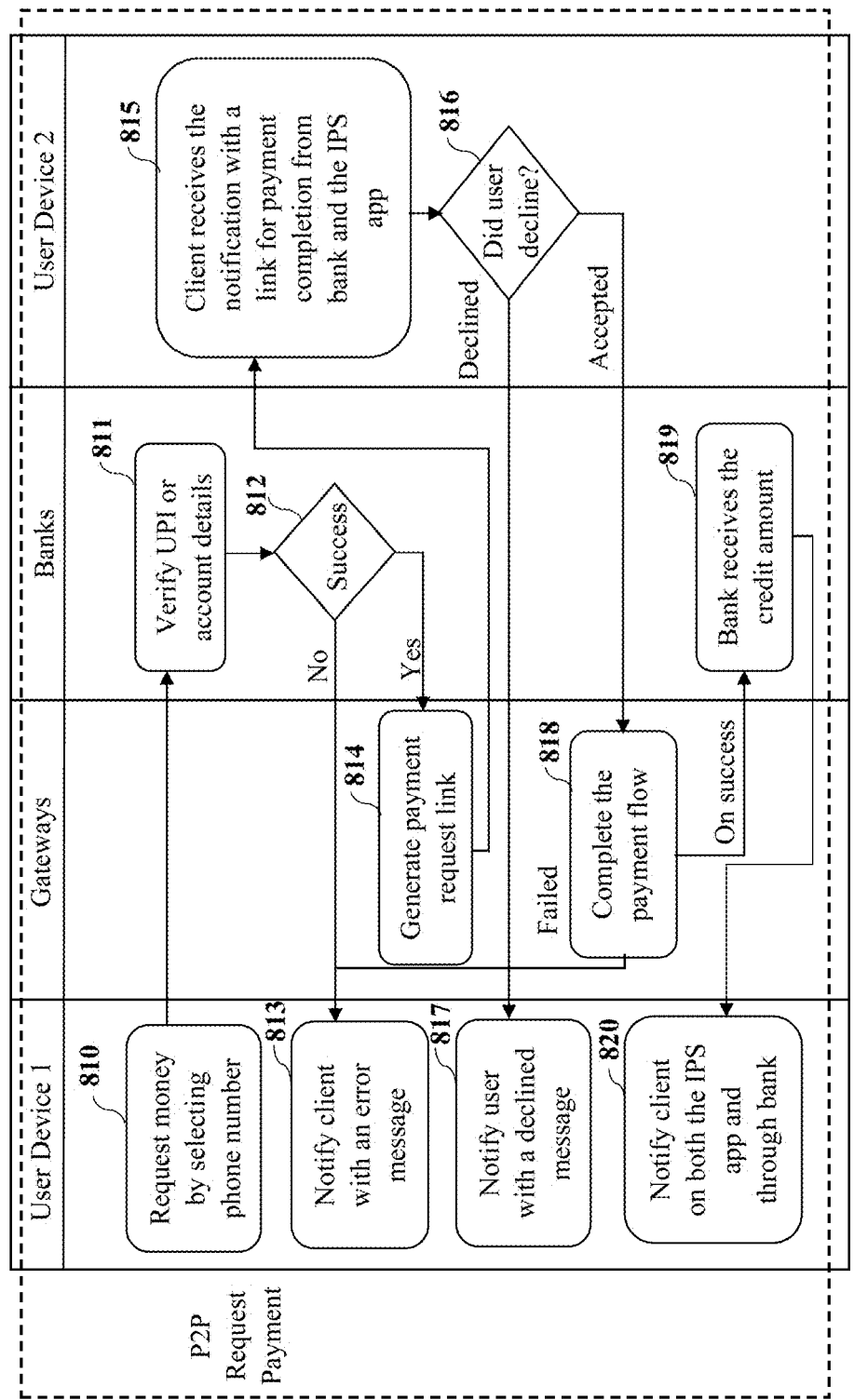

FIGS. 8A-8B illustrate flowcharts comprising transactional processes executed between different components of a system for managing payment transactions within an input interface, according to an embodiment of the embodiments herein. The system disclosed herein comprises multiple components, for example, client devices, payment gateways, banks, etc., communicatively coupled to each other via a secure network. As illustrated in FIG. 8A, when a user using a client device, for example, user device 1, wants to initiate a P2P payment transaction for transferring a payment to a recipient, the integrated payment system (IPS) in the input interface, for example, the keyboard, sends 801 a payment transfer request, for example, with a unified payments interface (UPI) address or bank account information to a payment gateway. The payment gateway confirms 802 the UPI address or the bank account information and executes an authentication process 803, for example, using a personal identification number (PIN) and a one-time password (OTP). If the authentication is not successful 804, the payment gateway notifies 805 the user by sending an error message to the user device 1. If the authentication is successful 804, the payment gateway securely communicates with the remitter bank to initiate 806 a debit from the remitter bank. If the debit transaction is successful 807, the beneficiary bank receives 808 the payment and notifies 809 the recipient of the payment, for example, through the integrated payment system installed in the keyboard of the recipient's user device 2. If the debit transaction is not successful 807, the remitter bank notifies 805 the user by sending an error message to the user device 1.

As illustrated in FIG. 8B, when a User X using a client device, for example, user device 1, wants to request for a payment from another User Y, User X initiates 810 the request by selecting a phone number of User Y from a contacts list or the integrated payment system (IPS) in the keyboard automatically detects User Y from a chat conversation in progress through the user application. The integrated payment system automatically detects an identifier of User Y, for example, a UPI ID or an account number and transmits the request to User Y's remitter bank via a payment gateway. The remitter bank verifies 811 the identifier. If the verification is not successful 812, the remitter bank transmits 813 a notification with an error message to User X's user device 1. If the verification is successful 812, the remitter bank communicates with the payment gateway to generate 814 a payment request link. The payment gateway transmits the payment request link to User Y's user device 2. User Y receives 815 the notification with the link for payment completion from the bank and the integrated payment system in the keyboard. The integrated payment system determines 816 whether User Y declines or accepts the payment request. If User Y declines payment request, the integrated payment system transmits a notification 817 to User X's user device 1. If User Y accepts the payment request, the integrated payment system in the keyboard invoked on the user device 2 communicates with the payment gateway to complete 818 the payment transaction with the beneficiary bank. On successful completion of the payment transaction, User X's account at the beneficiary bank receives 819 the credit amount and notifies 820 User X through the integrated payment system or through a message from the beneficiary bank.

Figure 9C:
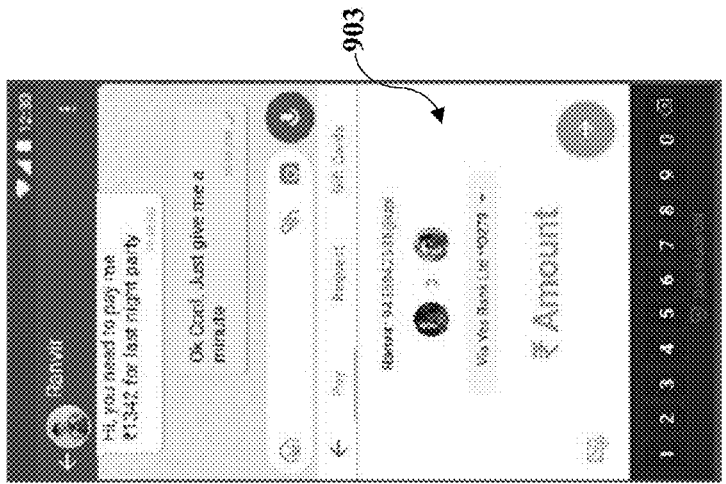
FIGS. 9A-9G exemplarily illustrate interfaces rendered on a user device during execution of a peer-to-peer send payment transaction when an identifier of a recipient is detected, according to an embodiment of the embodiments herein.
Figure 9B:
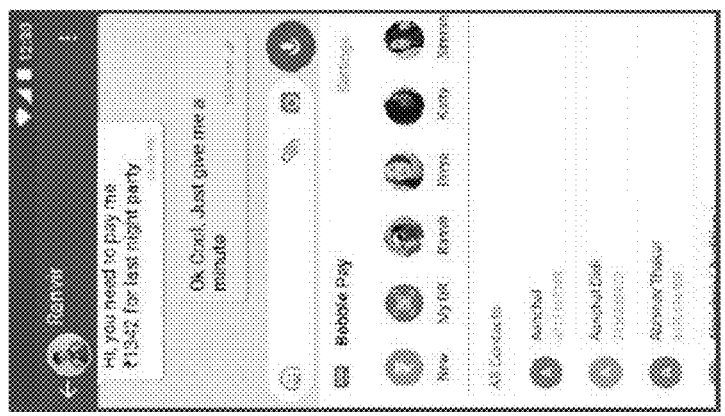
Figure 9A:
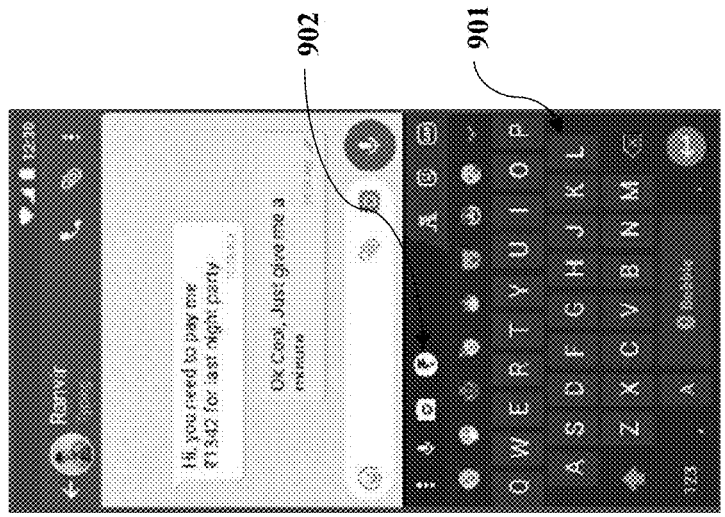
Figure 9G:
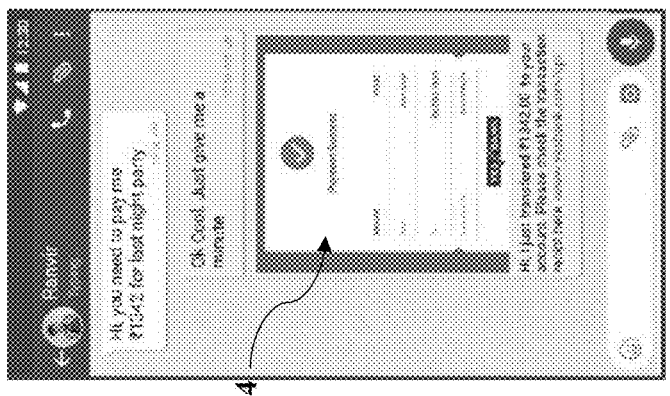
Figure 9F:
Figure 9E:
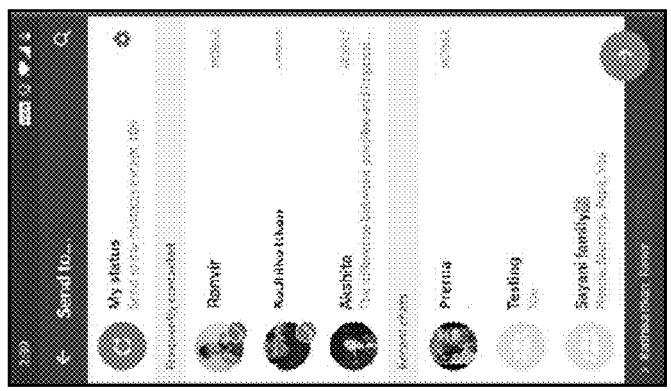
Figure 9D:
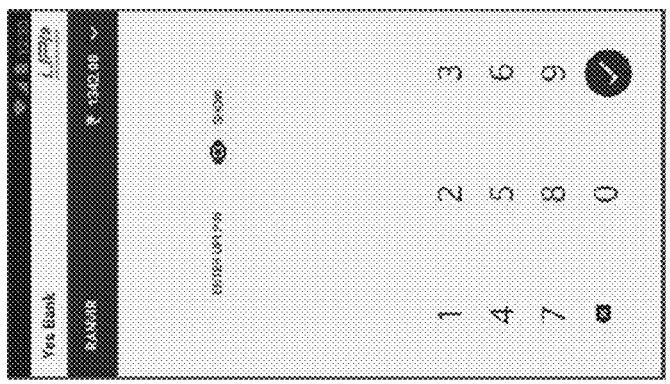

FIGS. 9A-9G exemplarily illustrate interfaces rendered on a user device during execution of a peer-to-peer (P2P) send payment transaction when an identifier of a recipient is detected, according to an embodiment of the embodiments herein. Consider an example where a user performs an input action, for example, a tap action or a click action, on the payment interface element, that is, the pay icon 902 displayed on the input interface, for example, the keyboard 901, invoked on the user device as illustrated in FIG. 9A. In an embodiment, the integrated payment system in the keyboard 901 allows the user to select a contact from a list of phone contacts to initiate a P2P send payment transaction as illustrated in FIG. 9B. In an embodiment, the integrated payment system allows the user to select a contact from a favourite contact list, where the contacts are listed based on recency or affinity. In an embodiment, the integrated payment system automatically detects the contact with whom the user is chatting through the user application and determines the identifier of the detected contact. The integrated payment system validates the contact's identifier, for example, unified payments interface (UPI) identifier (ID), UPI address such as username@handle, etc., based on the contact's phone number. On successful validation of the selected contact's identifier, the integrated payment system displays a payment screen 903 that allows the user to enter a payment amount, remarks, if any, etc., as illustrated in FIG. 9C, and proceed to enter a PIN as illustrated in FIG. 9D. After successful authentication, the integrated payment system facilitates the processing of the payment and generates a receipt 904 comprising the payment transaction information as illustrated in FIGS. 9E-9F. The integrated payment system allows the user to share the receipt 904 with the contact through a message as illustrated in FIG. 9G or through a uniform resource locator (URL) link.

Figure 10E:
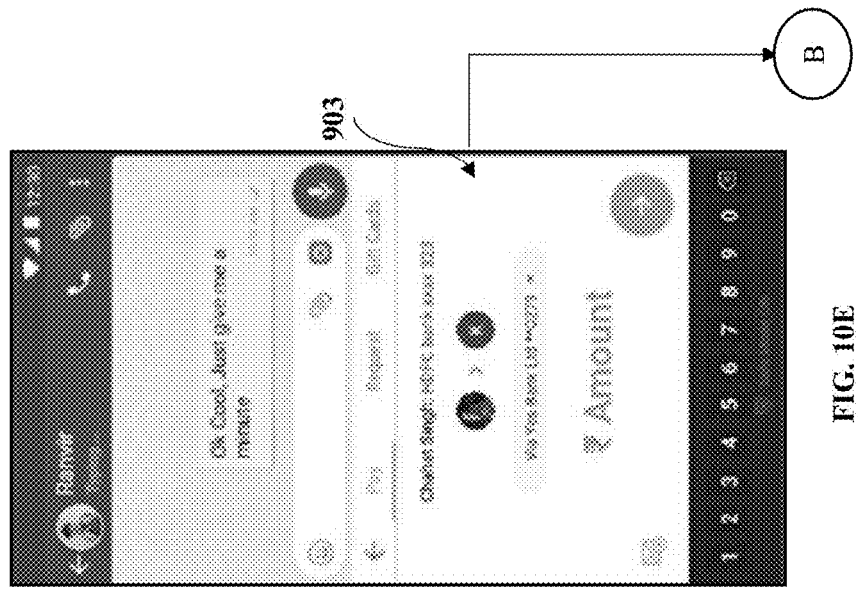
Figure 10D:
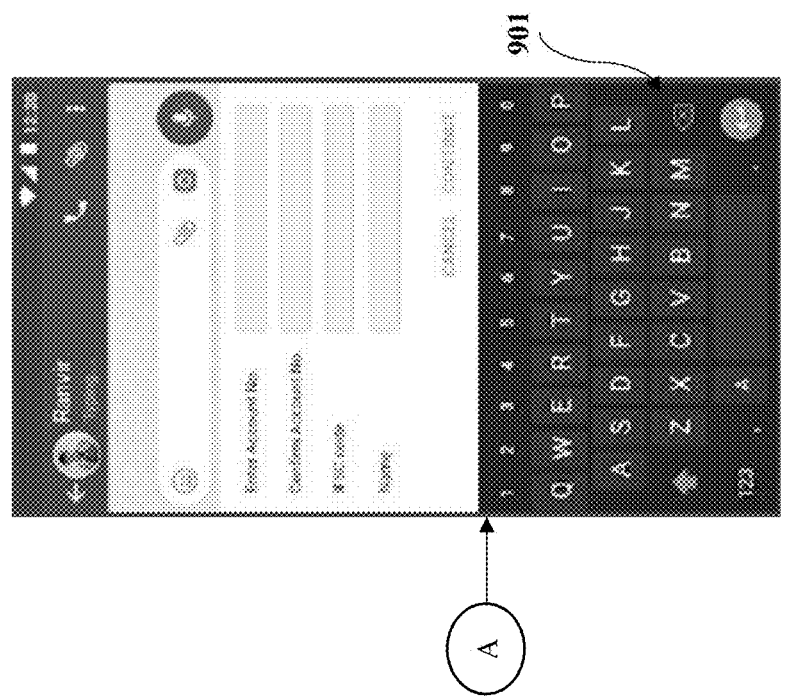
Figure 10H:
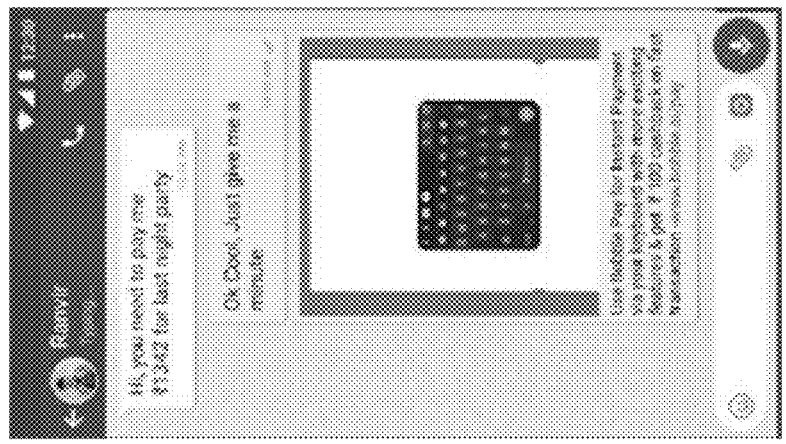
Figure 10G:
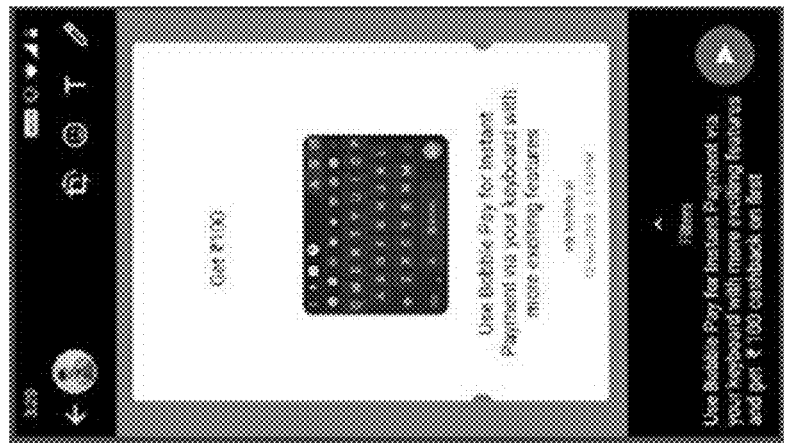
Figure 10F:
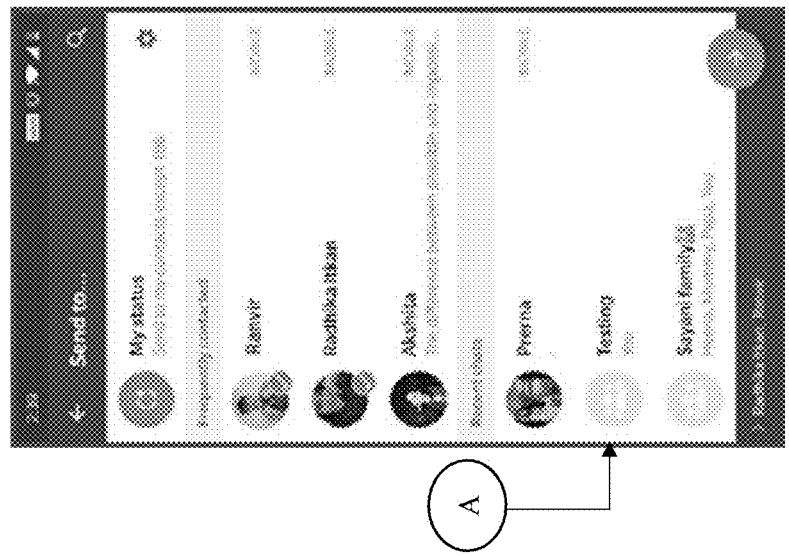

FIGS. 10A-10L exemplarily illustrate interfaces rendered on a user device during execution of a peer-to-peer (P2P) send payment transaction when an identifier of a recipient is not detected, according to an embodiment of the embodiments herein. In the example disclosed in the detailed description of FIGS. 9A-9G above, if the contact's identifier, for example, a virtual payment address (VPA) is not detected as displayed on the payment screen 903 illustrated in FIG. 10A, the integrated payment system provides multiple options to the user, for example, to enter a unified payments interface (UPI) identifier (ID) of the contact on an interface as illustrated in FIG. 10B, and receive a confirmation as illustrated in FIG. 10C, enter bank account information of the contact on an interface as illustrated in FIG. 10D to execute a bank transfer and receive a confirmation as illustrated in FIG. 10E, or send an invitation to the contact as illustrated in FIGS. 10F-10H.

Figure 10J:
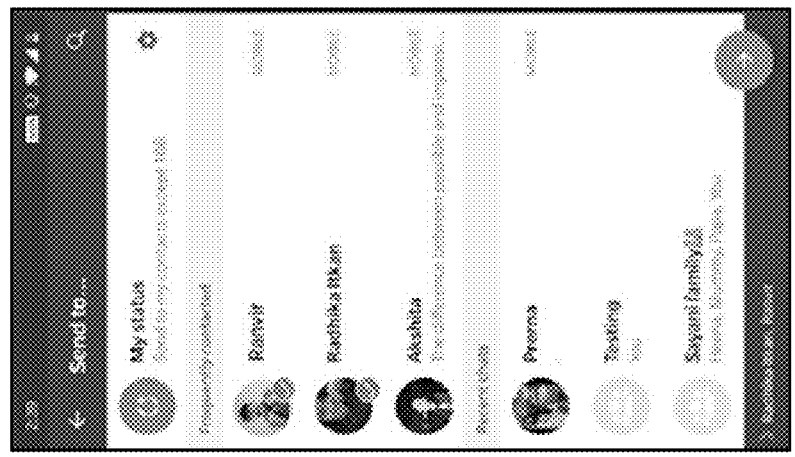
Figure 10I:
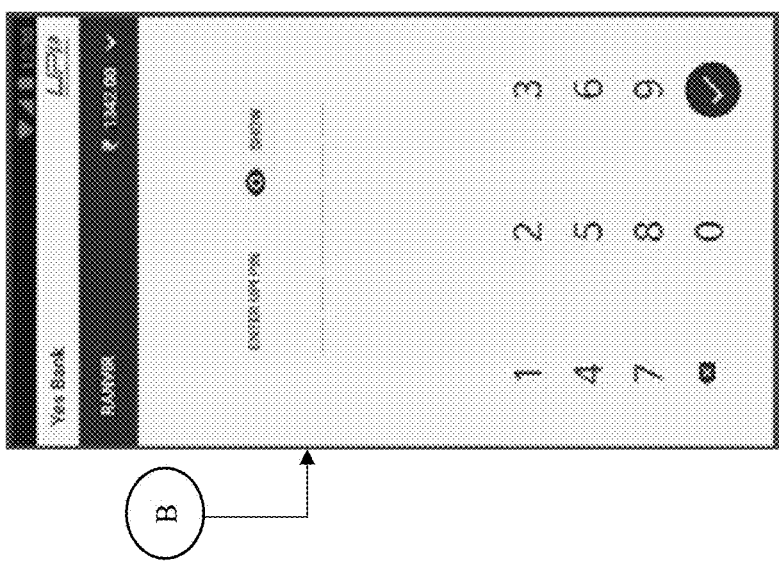

On successful validation of the contact's identifier, the integrated payment system displays the payment screen 903 illustrated in FIG. 10C and FIG. 10E that allows the user to enter a payment amount, remarks, etc., and proceed to enter a PIN as illustrated in FIG. 10I. After successful authentication, the integrated payment system facilitates the processing of the payment and generates a receipt 904 comprising the payment transaction information as illustrated in FIGS. 10J-10K. The integrated payment system allows the user to share the receipt 904 with the contact through a message as illustrated in FIG. 10L or through a uniform resource locator (URL) link.

Figure 11B:
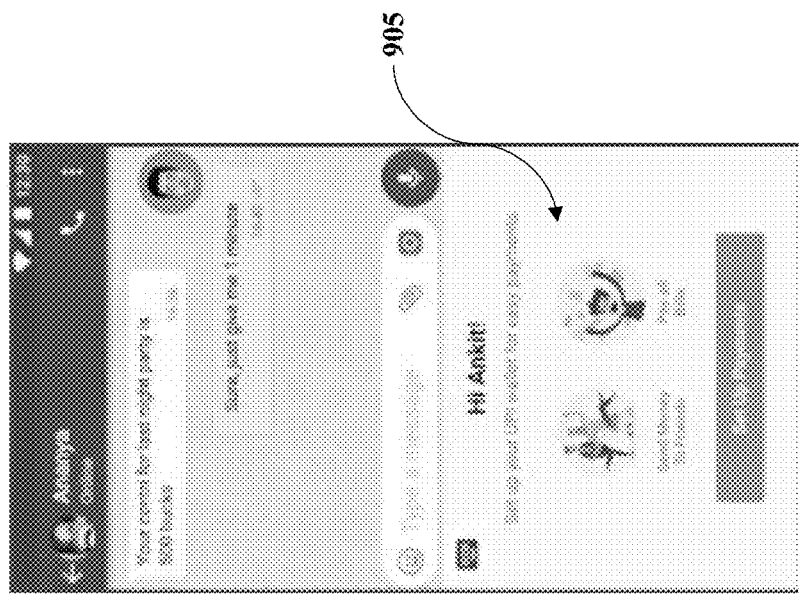
FIGS. 11A-11P exemplarily illustrate interfaces rendered on a user device during execution of an account setup operation, according to an embodiment of the embodiments herein.
Figure 11A:
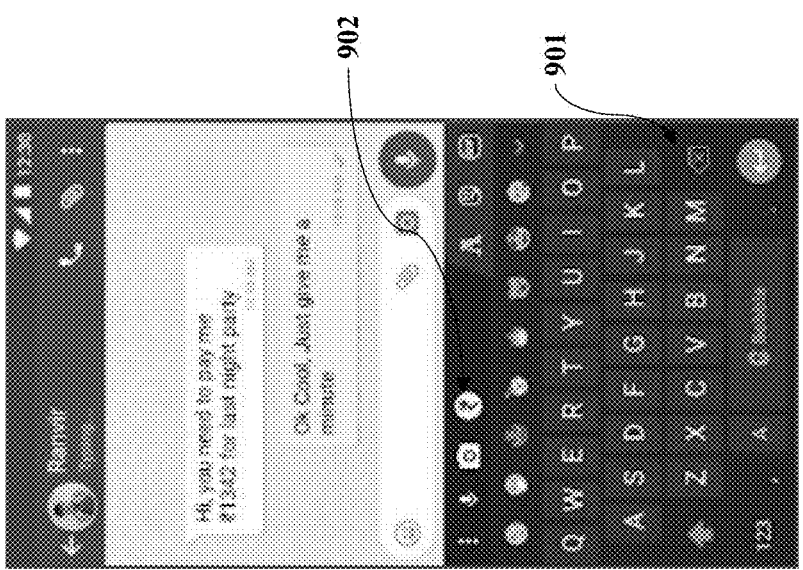
Figure 11C:
Figure 11E:
Figure 11D:
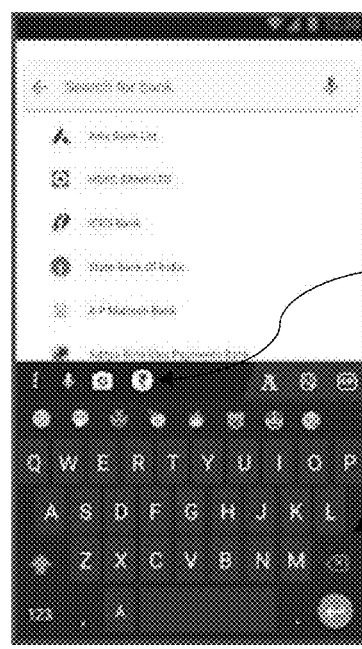
Figure 11F:
Figure 11I:
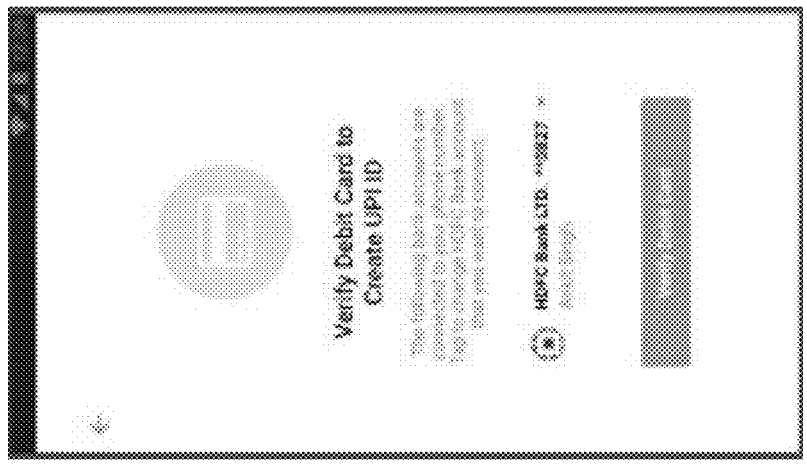
Figure 11H:
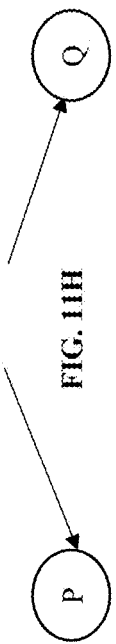
Figure 11H:
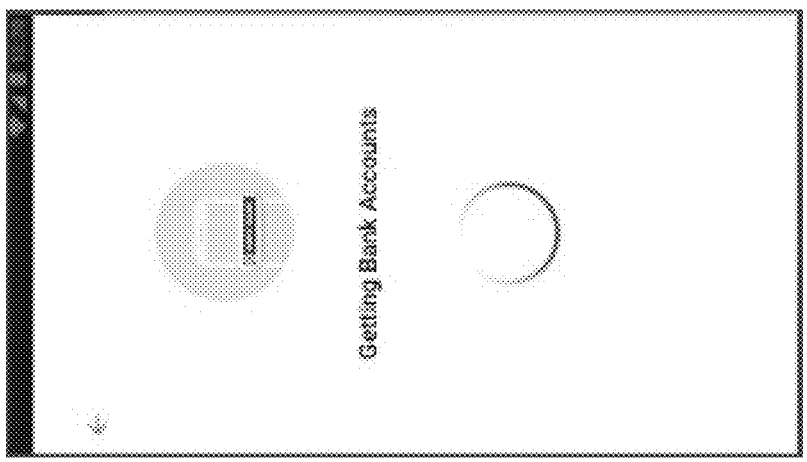
Figure 11G:
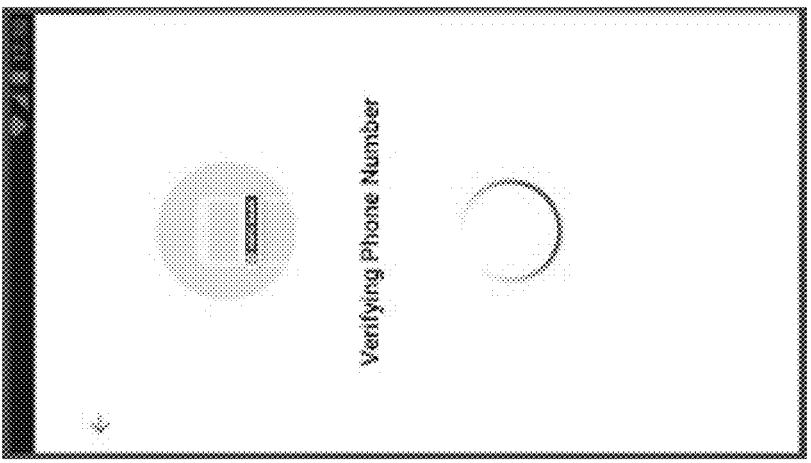
Figure 11K:
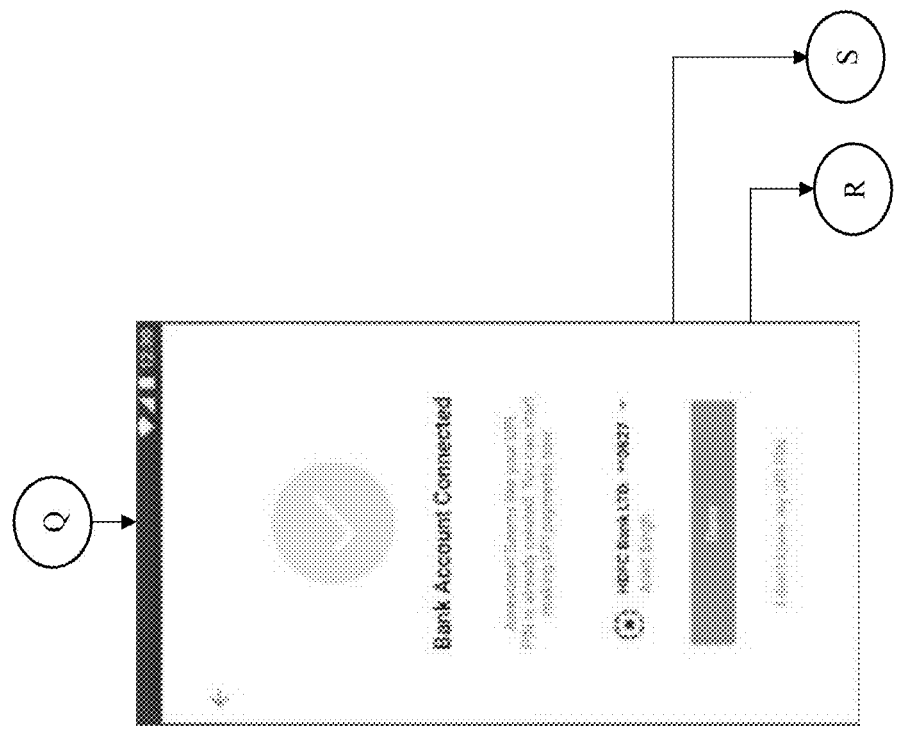
Figure 11J:
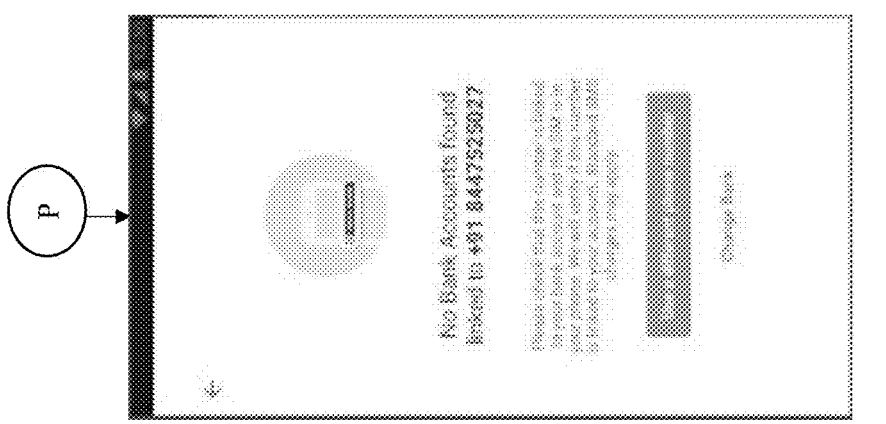
Figure 11M:
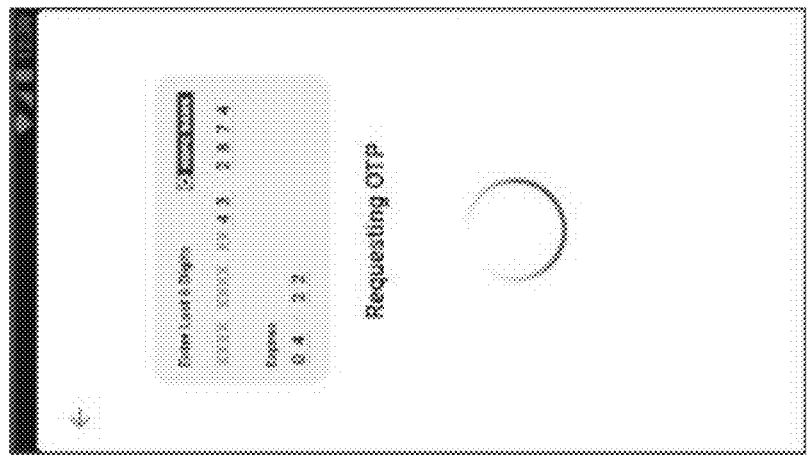
Figure 11L:
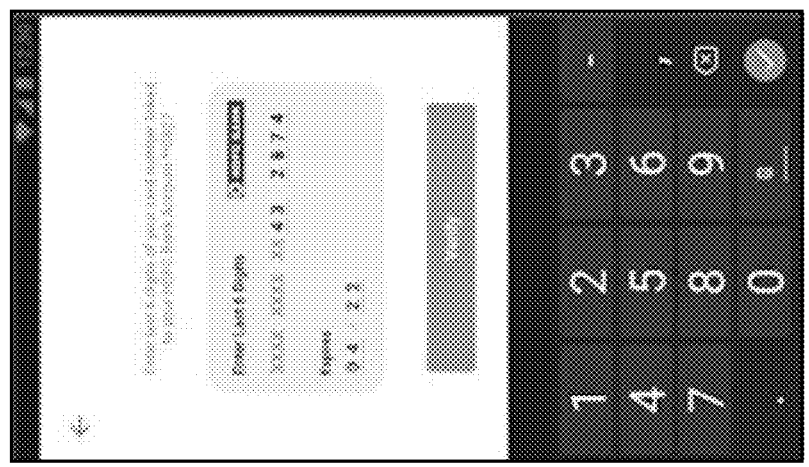
Figure 11P:
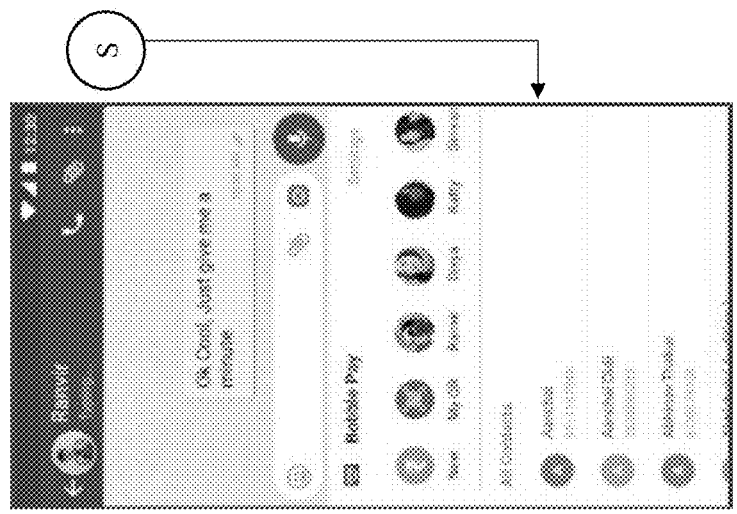
Figure 11O:
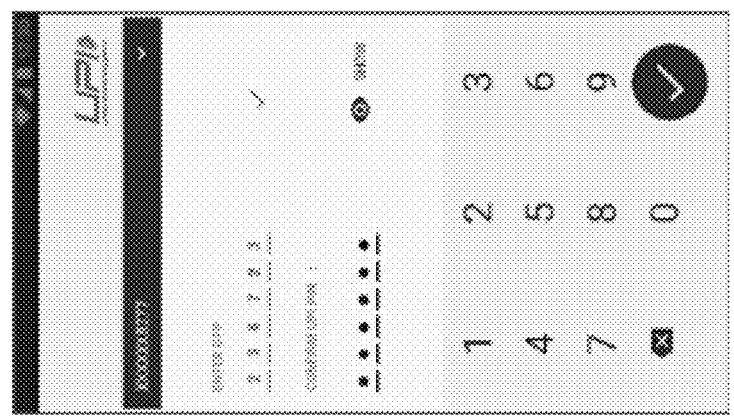
Figure 11N:
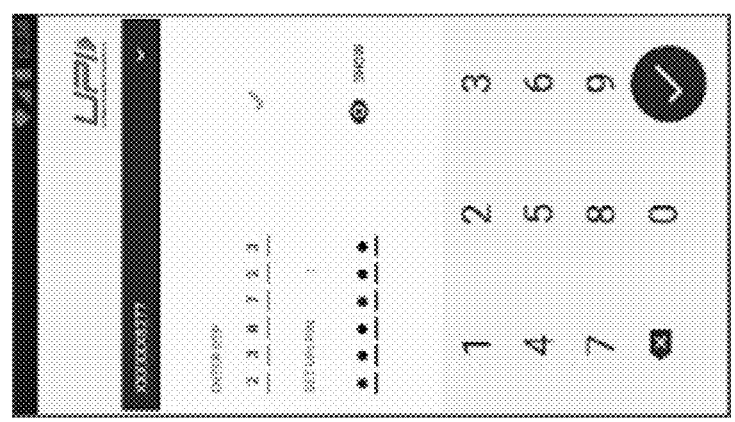

FIGS. 11A-11P exemplarily illustrate interfaces rendered on a user device during execution of an account setup operation, according to an embodiment of the embodiments herein. To setup an account with the integrated payment system, a user performs an input action, for example, a tap action or a click action, on the payment interface element, that is, the pay icon 902 displayed on the input interface, for example, the keyboard 901, invoked on the user device as illustrated in FIG. 11A. In response to the input action, the integrated payment system displays an account setup screen 905 as illustrated in FIG. 11B, to allow the user to setup an account, for example, a unified payments interface (UPI) account for UPI payments. The integrated payment system allows the user to select or search for a bank where an account is held as illustrated in FIGS. 11C-11D. The integrated payment system prompts the user regarding continuing with the phone number that the user used for logging into the integrated payment system as illustrated in FIG. 11E. If a user chooses to use a different phone number, the integrated payment system renders an interface for entering the different phone number as illustrated in FIG. 11F. The integrated payment system verifies the phone number and detects bank accounts linked to the phone number as illustrated in FIGS. 11G-11H. The integrated payment system requests the user to verify debit card information as illustrated in FIGS. 11I-11M to create a UPI ID and link the bank account to the phone number. The user may enter an existing PIN or set up a PIN to complete the account setup. After authenticating the PIN, the integrated payment system completes the account setup operation as illustrated in FIGS. 11N-11P.

Figure 12F:
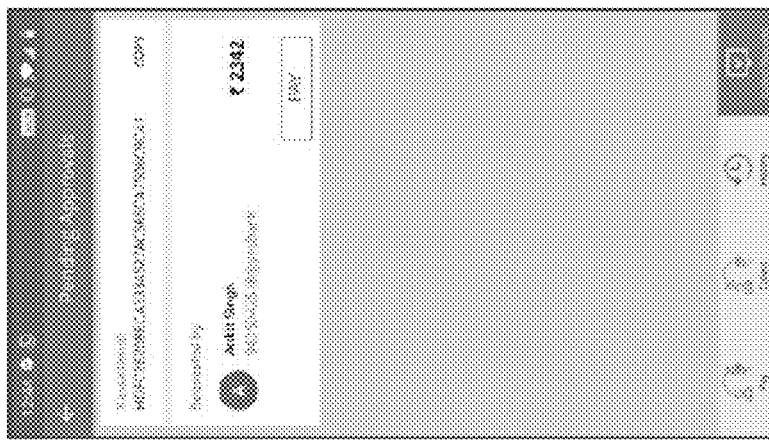
Figure 12E:
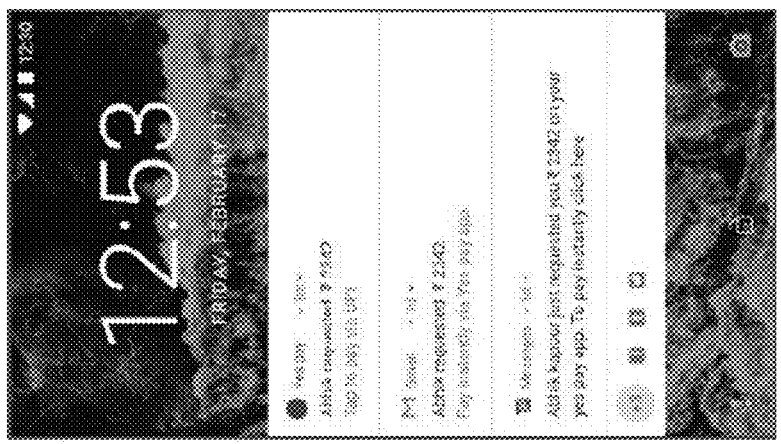
Figure 12D:
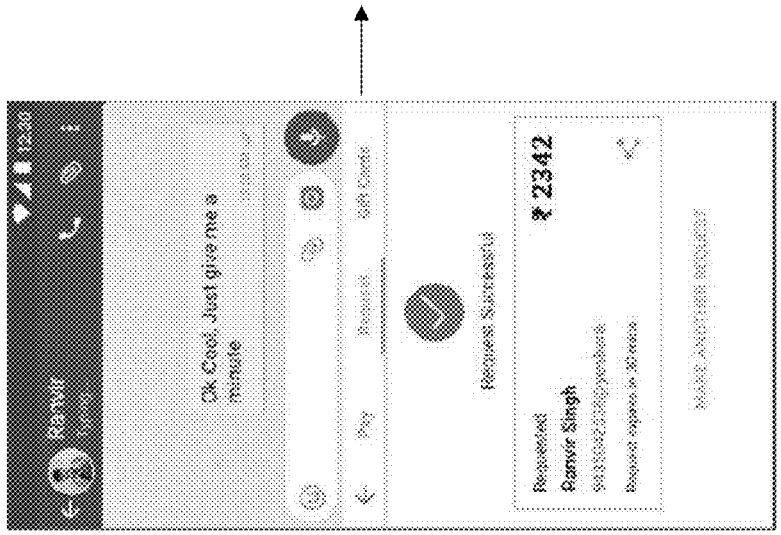

FIGS. 12A-12F exemplarily illustrate interfaces rendered on a user device during execution of a peer-to-peer (P2P) collect payment transaction when a payment request is sent, according to an embodiment of the embodiments herein. To initiate the P2P collect payment transaction, a user performs an input action, for example, a tap action or a click action, on the payment interface element, that is, the pay icon 902 displayed on the input interface, for example, the keyboard 901, invoked on the user device. The integrated payment system automatically detects a contact with whom the user is chatting through the user application and determines an identifier, for example, a unified payments interface (UPI) identifier (ID) or a UPI address "username@handle", of the detected contact. In an embodiment, the user selects a contact from a contact list to request a payment as illustrated in FIG. 12A and determines the UPI ID of the selected contact. On receiving the selection of the contact from the user, the integrated payment system validates the UPI ID based on the phone number. On successfully validating the UPI ID of the contact, the integrated payment system renders a payment screen 903 to allow the user to enter a payment amount, remarks, if any, and send the payment request as illustrated in FIGS. 12B-12C. The integrated payment system sends the payment request to the contact and displays a confirmation as illustrated in FIG. 12D. The integrated payment system detects an application linked to the contact's UPI ID and generates a shareable uniform resource locator (URL) deep linked to the application. The user may also share the payment request with the contact via the user application. The contact receives a notification from the contact's bank regarding the payment request from the user. The contact may access the link on a graphical user interface (GUI) as illustrated in FIG. 12E and proceed to approve the payment as illustrated in FIG. 12F.

Figure 13H:
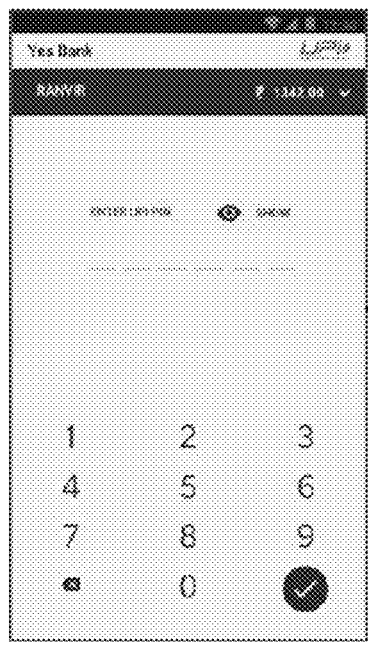
Figure 13I:
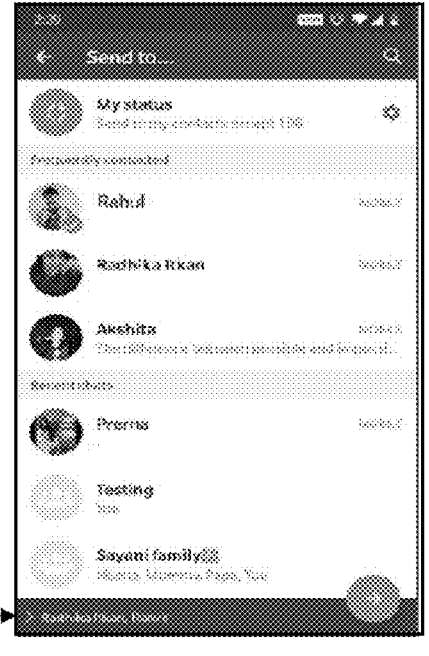
Figure 13J:
Figure 13K:

FIGS. 13A-13K exemplarily illustrate interfaces rendered on a user device during execution of a peer-to-peer (P2P) collect payment transaction when a payment request is received, according to an embodiment of the embodiments herein. When User X sends a payment request to User Y, the integrated payment system renders a notification 906 with information of the payment request proximal to the payment interface element, that is, the pay icon 902, as illustrated in FIG. 13A. In an embodiment, the integrated payment system displays a prompt on the keyboard 901, if User Y has not viewed the payment request details. In another embodiment, User Y also receives a notification from the bank linked to User Y's phone number as illustrated in FIG. 13D. On clicking or tapping the notification 906, the integrated payment system displays the payment request details with options to allow User Y to make the payment as requested immediately or later or to block the requester as illustrated in FIG. 13B and FIG. 13E. If User Y selects the option to pay immediately, the integrated payment system renders the payment screen 903 illustrated in FIG. 13C and proceeds to authenticate and complete the payment transaction as illustrated in FIG. 13F and FIGS. 13H-13I. After successful completion of the payment transaction, the integrated payment system generates a receipt 904 comprising the payment transaction information as illustrated in FIG. 13G and FIGS. 13J-13K. The integrated payment system allows User Y to share the receipt 904 with User X through a message as illustrated in FIG. 13K or through a uniform resource locator (URL) link.

Figure 14C:
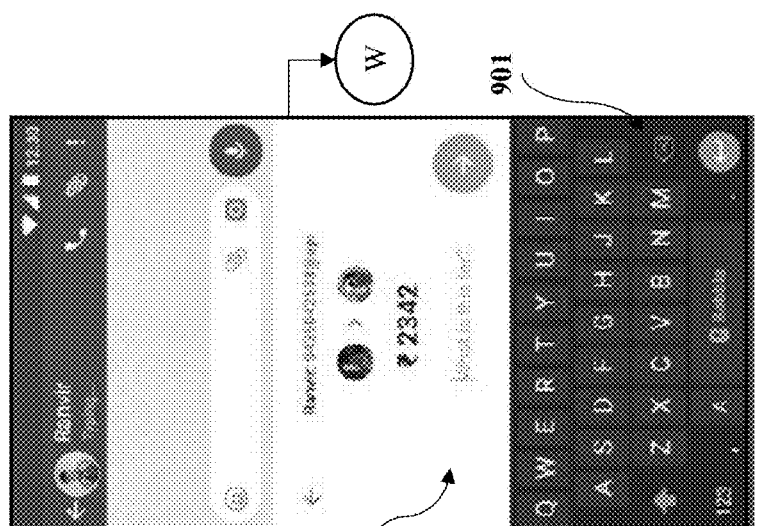
FIGS. 14A-14Q exemplarily illustrate interfaces rendered on a user device during execution of a peer-to-peer send payment transaction using different payment options, according to an embodiment of the embodiments herein.
Figure 14B:
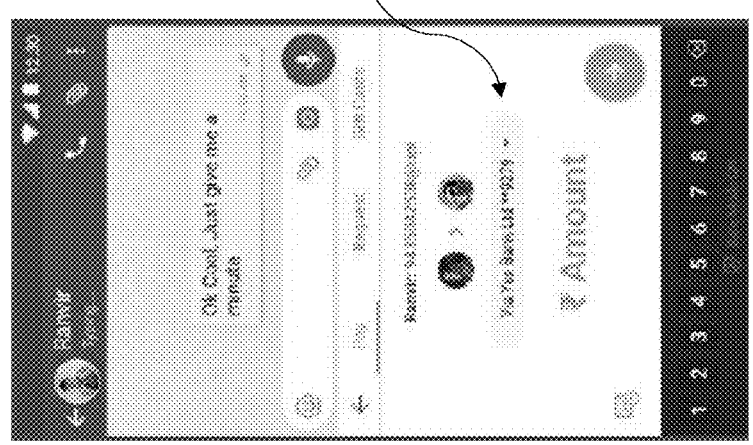
Figure 14A:
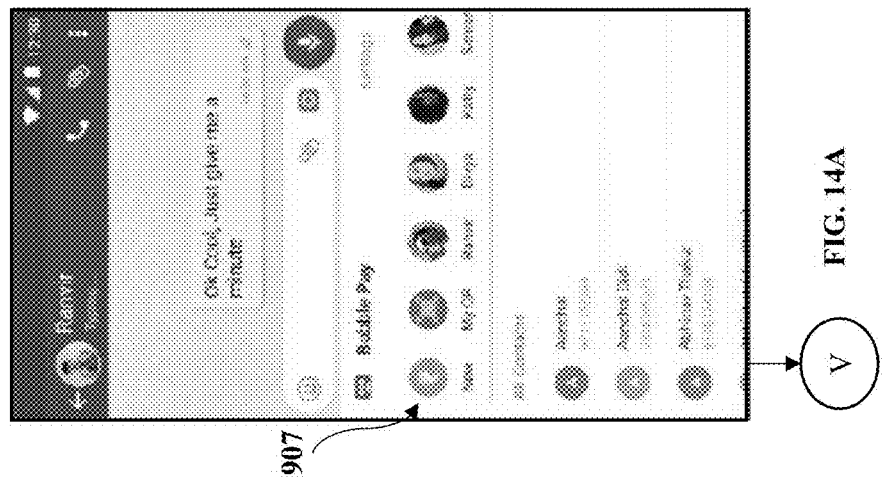
Figure 14G:
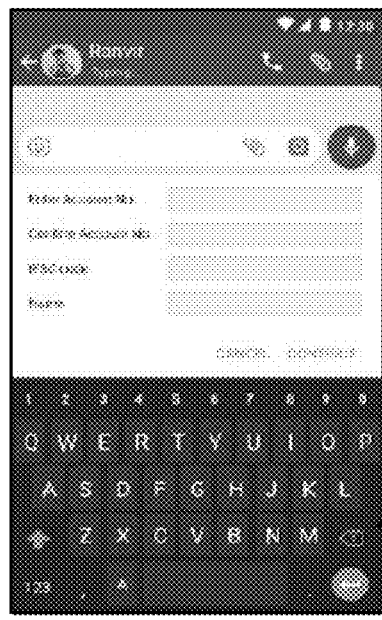
Figure 14H:
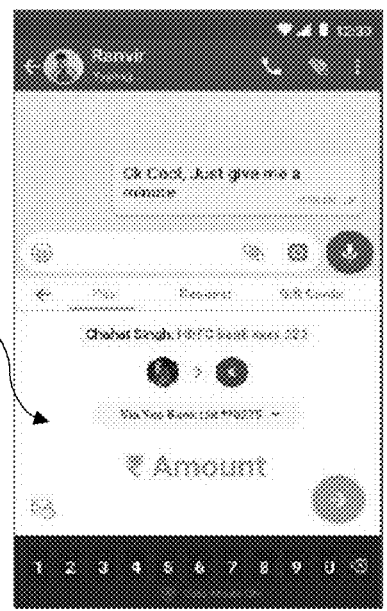
Figure 14I:
Figure 14J:
Figure 14M:
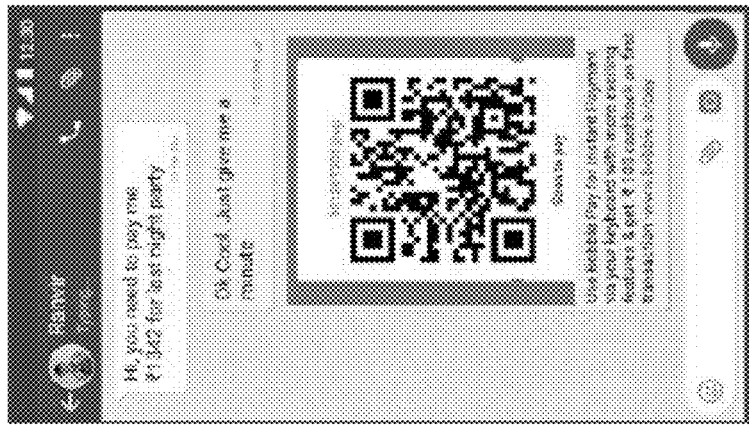
Figure 14L:
Figure 14K:
Figures 14N, 14O:
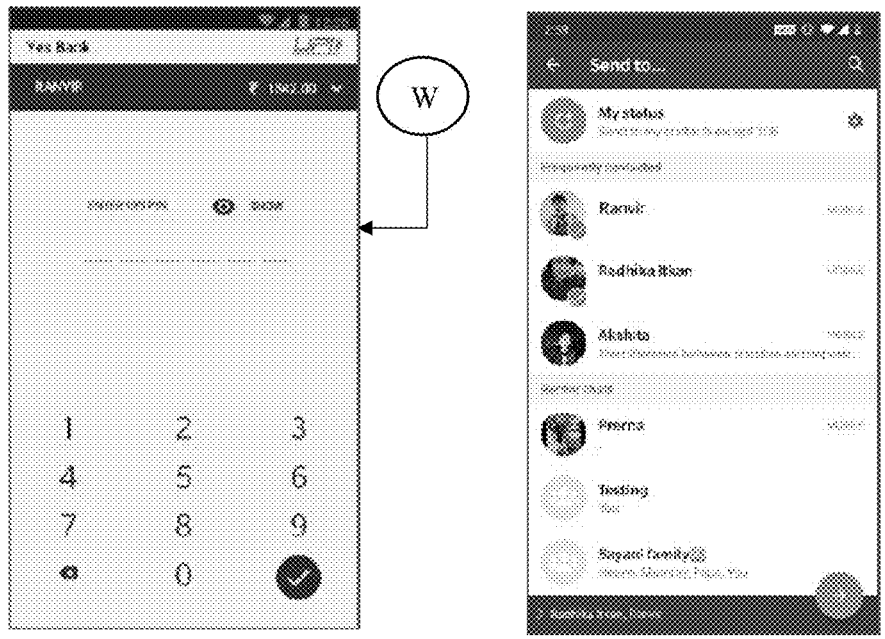
Figures 14P, 14Q:
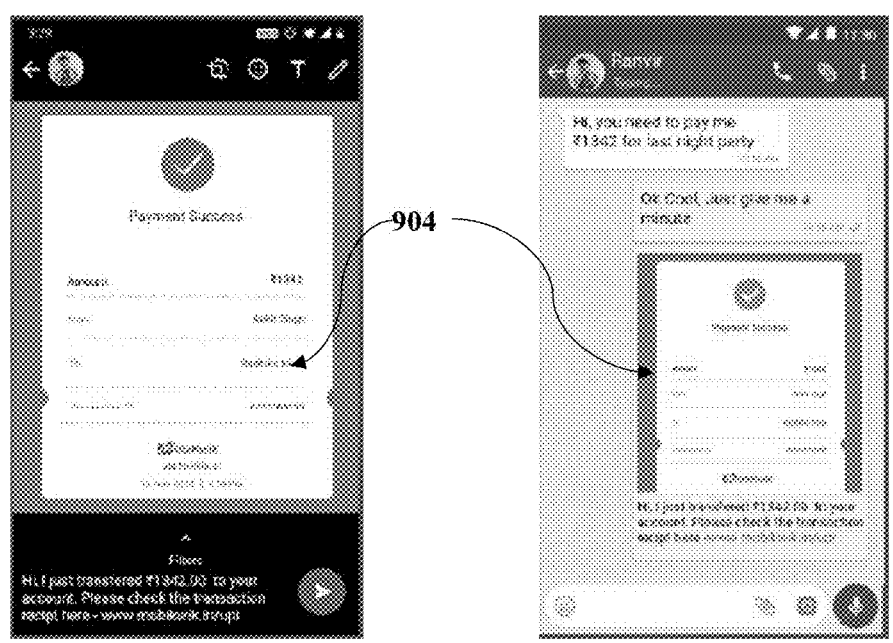

FIGS. 14A-14Q exemplarily illustrate interfaces rendered on a user device during execution of a peer-to-peer (P2P) send payment transaction using different payment options, according to an embodiment of the embodiments herein. The integrated payment system renders an option "New" 907 illustrated in FIG. 14A. When a user clicks on the option "New" 907, the integrated payment system renders a list of options for triggering a P2P send payment transaction. The options comprise, for example, sending a payment using an identifier such as a unified payments interface (UPI) identifier (ID), via a bank transfer, by scanning a code such as a quick-response (QR) code, to a phone number, or to a contact as illustrated in FIG. 14D. If the user selects the option to send a payment to a contact, the integrated payment system renders the payment screen 903 illustrated in FIGS. 14B-14C to allow the user to enter the payment amount and remarks, if any. If the user selects the option to send a payment using a UPI ID, the integrated payment system allows the user to enter the UPI ID of the recipient and proceed to enter the payment amount on the payment screen 903 as illustrated in FIGS. 14E-14F. If the user selects the option to send a payment via a bank transfer, the integrated payment system allows the user to enter the account information of the recipient and proceed to enter the payment amount on the payment screen 903 as illustrated in FIGS. 14G-14H. If the user selects the option to send a payment by scanning a code, for example, a QR code, the integrated payment system on the recipient's user device generates a sharable QR code with the recipient's UPI ID as illustrated in FIGS. 14K-14L that can be shared with the user as illustrated in FIG. 14M, and allows the user to scan the QR code and proceed to enter the payment amount on the payment screen 903 as illustrated in FIGS. 14I-14J. The integrated payment system on the user's device allows the user to scan any UPI QR code to detect a virtual payment address (VPA) and proceed with payment transactions.

After entering the payment amount and remarks, if any, the integrated payment system requests the user to enter a UPI PIN and select the recipient as illustrated in FIGS. 14N-14O, and then facilitates processing of the payment and generates a receipt 904 comprising the payment transaction information as illustrated in FIGS. 14P-14Q. The integrated payment system allows the user to share the receipt 904 with the contact through a message as illustrated in FIG. 14Q or through a uniform resource locator (URL) link.

FIGS. 15A-15D exemplarily illustrate interfaces rendered on a user device for executing transaction management operations, according to an embodiment of the embodiments herein. The integrated payment system provides access to trigger transaction management operations, for example, through a payment settings icon 908 that is accessible from the keyboard settings screen or inside the keyboard as illustrated in FIG. 15A. On clicking the payment settings icon 908, the integrated payment system renders a payment settings screen 909 that displays a username, a unified payments interface (UPI) identifier (ID) that can be copied to a clipboard, a display image from keyboard settings, payment history, for example, the last two transactions with an option to view all transactions, linked bank accounts, an option to add a new account, etc., as illustrated in FIG. 15B. On clicking one of the linked bank accounts displayed on the payment settings screen 909, the integrated payment system displays bank account details with an option to reset the UPI PIN, an option to check balance, and an option to remove the bank account as illustrated in FIG. 15C. When the user clicks on the option to check balance, the integrated payment system requests the user to enter the UPI PIN and then displays the balance as illustrated in FIG. 15D.

Figure 16A:
FIGS. 16A-16D exemplarily illustrate interfaces rendered on a user device for executing additional transaction management operations, according to an embodiment of the embodiments herein.
Figure 16B:
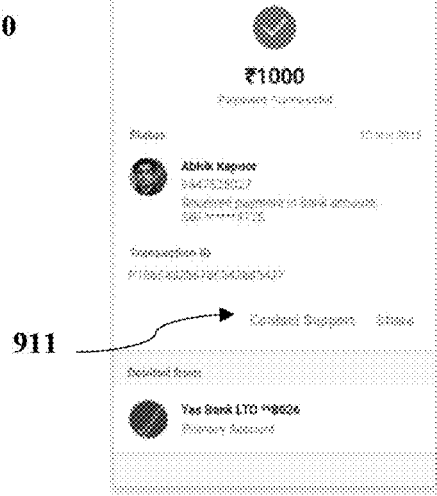
Figure 16C:
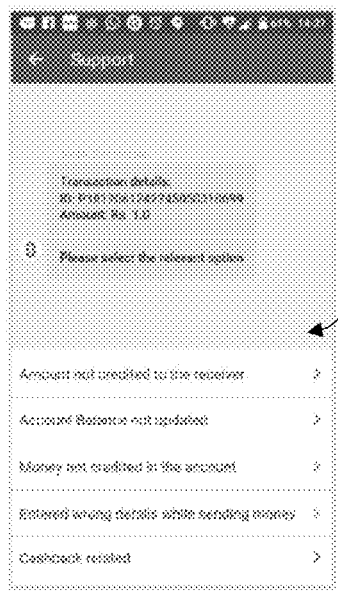
Figure 16D:
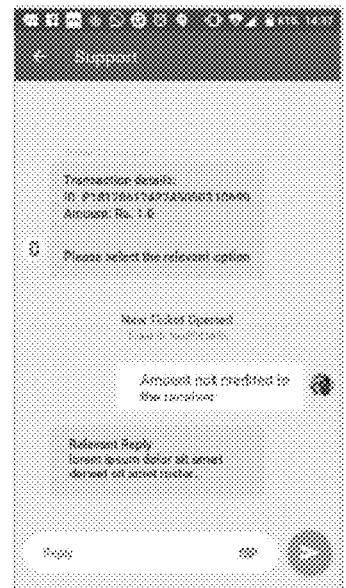

FIGS. 16A-16D exemplarily illustrate interfaces rendered on a user device for executing additional transaction management operations, according to an embodiment of the embodiments herein. When a user selects an option to view transaction history, the integrated payment system displays a list 910 of transactions performed as illustrated in FIG. 16A. The integrated payment system allows the user to select any transaction from the list 910 to view transaction details as illustrated in FIG. 16B. The integrated payment system also allows the user to contact support for each transaction. When a user taps on the contact support option 911 illustrated in FIG. 16B, the integrated payment system renders a support screen 912 as illustrated in FIG. 16C. The integrated payment system allows the user to select one of multiple predefined options displayed on the support screen 912 to report an issue as illustrated in FIG. 16D. Each issue is responded with predefined responses. The integrated payment system sends the issue to a bank, opens a ticket, or displays a response as illustrated in FIG. 16D. The user may attach files such as images or screenshots and share the files with the bank. A short message service (SMS) message or notification may be sent for a response, which is deep linked to the support screen 912.

Figure 17:
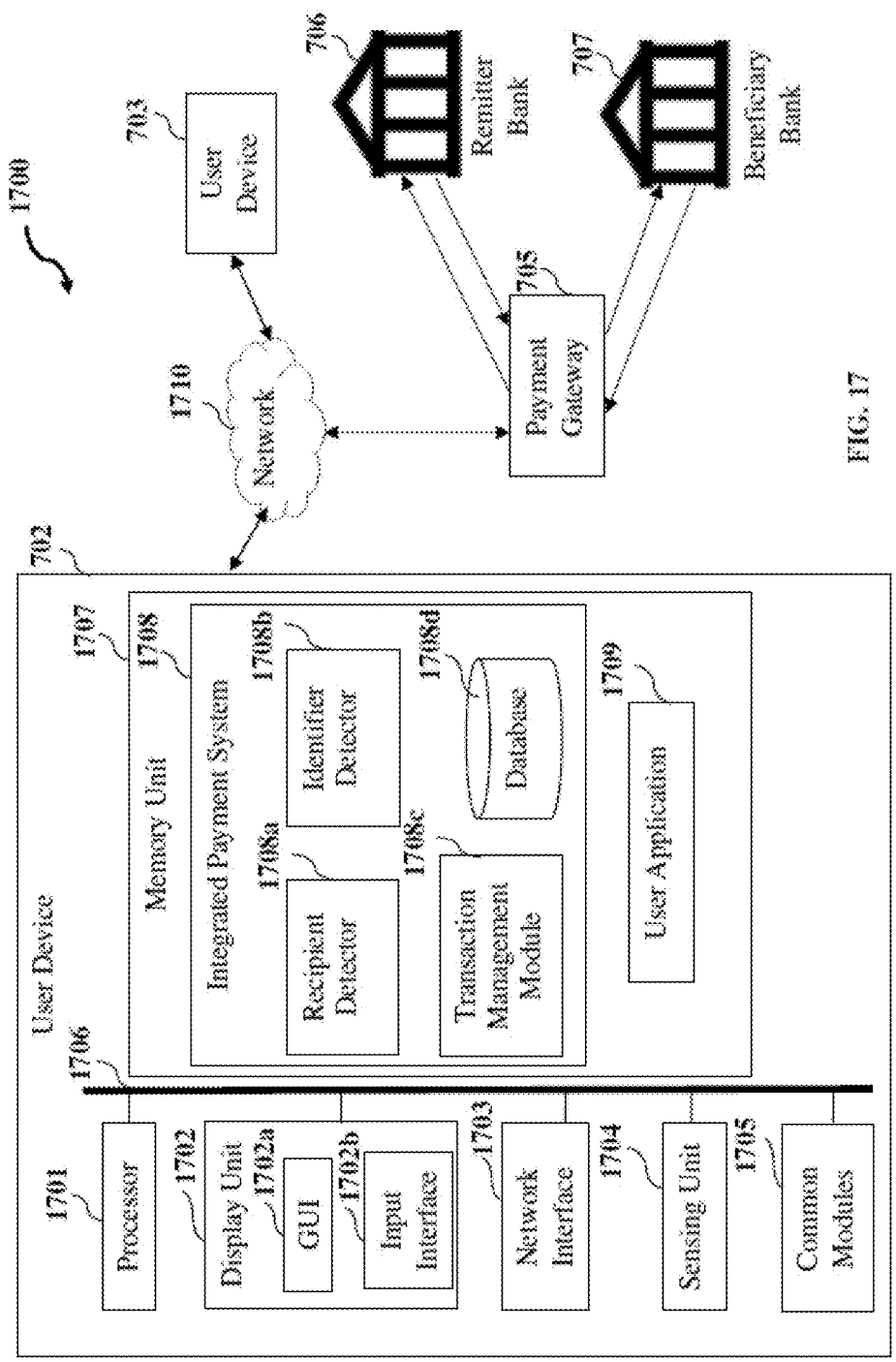
FIG. 17 illustrates an architectural block diagram of an exemplary implementation of a system for managing payment transactions within an input interface, according to an embodiment of the embodiments herein.

FIG. 17 illustrates an architectural block diagram of an exemplary implementation of the system 1700 for managing payment transactions within an input interface 1702b, according to an embodiment of the embodiments herein. In an embodiment, the system 1700 disclosed herein comprises the payment system 1708 integrated in an input interface 1702b invoked on a user device 702, for example, a smartphone, a tablet computing device, etc., as illustrated in FIG. 17. In an embodiment, the integrated payment system 1708 is implemented using programmed and purposeful hardware of the user device 702. In an embodiment, the integrated payment system 1708 is tied to another application, for example, a bank application that only allows their input interfaces for passwords or identifiers (IDs) for security purposes. In another embodiment, the integrated payment system 1708 is added to a separate application and used irrespective of the application.

In an embodiment, the integrated payment system 1708 is accessible to users, for example, through a broad spectrum of technologies and user devices such as smart phones, tablet computing devices, endpoint devices, etc., with access to a network 1710, for example, a short-range network or a long-range network. The network 1710 is, for example, one of the internet, an intranet, a wired network, a wireless network, a network that implements Wi-Fi® of Wi-Fi Alliance Corporation, a mobile telecommunication network, etc., or a network formed from any combination of these networks. In an embodiment, the integrated payment system 1708 deployed in the user device 702 communicates with a payment gateway 705 via the network 1710. The payment gateway 705 securely accesses banks 706 and 707 involved in payment transactions. The payment gateway 705 also communicates with the user device 703 involved in the payment transactions via the network 1710.

As illustrated in FIG. 17, the user device 702 comprises at least one processor 1701 and a non-transitory, computer-readable storage medium, for example, a memory unit 1707, for storing computer program instructions defined by the modules, for example, 1708a, 1708b, and 1708c of the integrated payment system 1708. In an embodiment, the modules, for example, 1708a, 1708b, 1708c, and 1708d of the integrated payment system 1708 and the user application 1709 are stored in the memory unit 1707 as illustrated in FIG. 17. The user application 1709 is, for example, a messaging application, a business communication application, an electronic commerce (e-commerce) application, an email application, a gaming application, a media application, etc., deployed on the user device 702.

The processor 1701 is operably and communicatively coupled to the memory unit 1707 for executing the computer program instructions defined by the modules, for example, 1708a, 1708b, and 1708c of the integrated payment system 1708. The processor 1701 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. The integrated payment system 1708 is not limited to employing the processor 1701. In an embodiment, the integrated payment system 1708 employs one or more controllers or microcontrollers.

As illustrated in FIG. 17, the user device 702 further comprises a data bus 1706, a display unit 1702, a network interface 1703, a sensing unit 1704, and common modules 1705. The data bus 1706 permits communications between the modules, for example, 1701, 1702, 1703, 1704, 1705, and 1707. The display unit 1702, via a graphical user interface (GUI) 1702a, displays information, display interfaces, media content, user interface elements such as checkboxes, input text fields, etc., for example, for allowing a user to invoke and execute the integrated payment system 1708, input data and perform input actions for executing payment transactions and transaction management operations.

The network interface 1703 enables connection of the integrated payment system 1708 to the network 1710. The network interface 1703 is, for example, one or more of infrared interfaces, interfaces implementing Wi-Fi® of Wi-Fi Alliance Corporation, universal serial bus interfaces, FireWire® interfaces of Apple Inc., interfaces based on transmission control protocol/internet protocol, interfaces based on wireless communications technology such as satellite technology, radio frequency technology, near field communication, etc. The sensing unit 1704 comprises one or more sensors operably coupled to the processor 1701 of the user device 702. The sensors comprise, for example, tactile sensors, image sensors, motion sensors, gesture sensors, etc., and other sensors configured to receive inputs of different types from a user. The common modules 1705 of the user device 702 comprise, for example, input/output (I/O) controllers, input devices, output devices, fixed media drives such as hard drives, removable media drives for receiving removable media, etc. Computer applications and programs are used for operating the integrated payment system 1708. The programs are loaded onto fixed media drives and into the memory unit 1707 via the removable media drives. In an embodiment, the computer applications and programs are loaded into the memory unit 1707 directly via the network 1710.

In an embodiment, the integrated payment system 1708 comprises multiple modules defining computer program instructions, which when executed by the processor 1701, cause the processor 1701 to manage payment transactions within the input interface 1702b. In an embodiment, the modules of the integrated payment system 1708 comprise a recipient detector 1708a, an identifier detector 1708b, a transaction management module 1708c, and a database 1708d.

The integrated payment system 1708 renders a payment interface element, for example, a pay icon, of the integrated payment system 1708 on the input interface 1702b. In response to a user input action, for example, a click action, on the payment interface element, the recipient detector 1708a automatically detects a recipient for a payment transaction during an interaction between users, for example, a sender and the recipient, through the user application 1709. The recipient detector 1708a communicates with the user application 1709 to detect the recipient. The identifier detector 1708b automatically determines an identifier of the detected recipient and account information linked to the identifier of the detected recipient. The transaction management module 1708c executes the payment transaction between the sender and the detected recipient using the identifier and/or the account information linked to the identifier. The transaction management module 1708c generates and renders transaction information within the input interface 1702b for convenient access by the users. The transaction information comprises a receipt sharable through the user application 1709, history of receipts, etc., accessible from within the input interface 1702b. In an embodiment, the transaction management module 1708c executes transaction management operations from within the input interface 1702b. The transaction management operations comprise, for example, account setup operations, payment transfer operations, payment collection operations, invitations, support operations via a support interface, balance enquiry handling operations, etc. The database 1708d stores the user information, account information, and transaction information.

The recipient detector 1708a, the identifier detector 1708b, and the transaction management module 1708c are disclosed above as software executed by the processor 1701. In an embodiment, the modules, for example, 1708a, 1708b, and 1708c of the integrated payment system 1708 are implemented completely in hardware. In another embodiment, the modules, for example, 1708a, 1708b, and 1708c of the integrated payment system 1708 are implemented by logic circuits to carry out their respective functions disclosed above. In another embodiment, the integrated payment system 1708 is also implemented as a combination of hardware and software including one or more processors, for example, 1701, that are used to implement the modules, for example, 1708a, 1708b, 1708c, and 1708d of the integrated payment system 1708. The processor 1701 retrieves instructions defined by the recipient detector 1708a, the identifier detector 1708b, and the transaction management module 1708c from the memory unit 1707 for performing respective functions disclosed above. The non-transitory, computer-readable storage medium disclosed herein stores computer program instructions executable by the processor 1701 for managing payment transactions within the input interface 1702b.

The embodiments herein allow a user to perform payment transactions directly within an input interface, for example, a keyboard, so that the user does not need to navigate to another payment application external to a user application being used, thereby providing a convenient experience to the user. As the payment system is integrated in the input interface, the payment system is accessible with any user application containing input fields such as text fields that invoke the input interface. The integrated payment system requires users to confirm details and provides a searching option to an account for a linked bank. The embodiments herein detect an identifier, for example, a unified payments interface (UPI) address linked to a contact with whom the user is currently chatting through the user application. The embodiments herein implement a process of detecting identifiers, for example, UPI addresses from the input interface while the input interface is launched within a user application. The embodiments herein allow a single click payment in the input interface using the UPI. The embodiments herein render notifications and prompts for incoming payment requests within the input interface. The embodiments herein allow generation of receipts and history of transactions and receipts from within the input interface. The embodiments herein also allow instant sharing of the generated receipts as messages directly through the input interface so that users do not have to undergo a lengthy process of navigating to a bank website or a banking application to generate the receipts and share the receipts therefrom. The embodiments herein preclude the need for installing multiple banking applications and switching between multiple bank applications or keyboards, as all payment transactions, for example, from account linking to sending and receiving payments are executed within the input interface. The embodiments herein also provide support with a chat window from the input interface itself, from where the user can enter details and report issues similar to any bank support. The embodiments herein is associated with payments and digital transactions to provide the feasibility and ease of access to payment methods, directly through the input interface, to preclude the user from having to move to another application for the transactions and to allow execution of payment transactions while users chat through a user application. The embodiments herein also determine the context of a communication between users and renders prompts to the users for the payment options available within the input interface. The embodiments herein also allow a direct transmission of transaction information, payment request links, etc., to the other user involved in the same chat window after receiving a confirmation from the user.

The embodiments herein provide a convenient method for managing multiple payment options to enable peer-to-peer (P2P) direct transactions for quick payments through UPI or any other payment gateway. The embodiments herein implement multiple bank APIs and related data is used in the input interface itself, thereby allowing all payment related actions to be performed on the input interface. The embodiments herein can be implemented in financial technology applications and wallet-based applications from within the input interface. Brand entities may package the input interface inside their application for input interface usage as well as their own flow for payments and transactions.

The foregoing examples and illustrative implementations of various embodiments have been provided merely for explanation and are in no way to be construed as limiting of the embodiments disclosed herein. While the embodiments herein have been described with reference to various embodiments, illustrative implementations, drawings, and techniques, it is understood that the words, which have been used herein, are words of description and illustration, rather than words of limitation. Further, although the embodiments herein have been described herein with reference to particular means, materials, embodiments, techniques, and implementations, it is not intended to be limited to the particulars disclosed herein; rather, the embodiments disclosed herein extends to all functionally equivalent structures, methods and uses, such as are within the scope of the appended claims. It will be understood by those skilled in the art, having the benefit of the teachings of this specification, that the embodiments herein are capable of modifications and other embodiments may be affected and changes may be made thereto, without departing from the scope and spirit of the embodiments disclosed herein.

What is claimed is:

1. An integrated payment system, comprising:
    a memory storing a plurality of computer program instructions; and
    a hardware processor operatively coupled to the memory, wherein the hardware processor is configured to execute the plurality of computer program instructions to:
    present a payment interface element at an input interface of a messaging application on a user device;
    receive a selection of the payment interface element, wherein the payment interface element on the input interface of the user device is configured to be operated independently of the messaging application;
    detect a recipient for a payment transaction, during an interaction between at least two user devices through the messaging application based on the selection of the payment interface element;
    present an identifier corresponding to the detected recipient, wherein the identifier represents account information of the recipient, a phone number, an account number, a payment gateway identifier, and a transaction address; and
    execute a payment transaction between the user device and the recipient based on the identifier; wherein the payment interface element is a currency icon, or a pay icon, and wherein the payment interface element is displayed on a bar which is arranged above the input interface, and wherein the hardware processor is configured to execute the plurality of computer program instructions to identify context of the interaction between a user corresponding to the user device and the recipient, and render a notification of payment options available on the input interface based on the context, and wherein the detection of recipient includes at least one of identification of bank accounts or a unified payments interface (UPI) accounts linked to at least one of an account number, a phone number, or other identifier of the recipient, and wherein the integrated payment system determines a context of the interaction between the users and renders a notification of payment options available to the users within the input interface, on at least one of the input interface and the Graphical User Interface (GUI) of the user application, and wherein the integrated payment system generates and renders prompts regarding a context of a current communication or chat between users, and wherein the integrated payment system detects the context in real time and provides a prompt within the input interface from which the users access payment screens, when the context is related to payments or finance, and wherein the hardware processor is configured to execute the plurality of computer program instructions to execute the complete process of linking directly from within the input interface, thereby precluding a requirement for switching between applications on the user device to perform basic account setup operations and making the linking process more convenient for the user, if a bank account or a UPI account is not connected or linked to the input interface, and wherein the integrated payment system on the recipient's user device generates a sharable quick response (QR) code with the recipient's UPI ID that is shared with the user and allows the user to scan the QR code and proceed to enter the payment amount on the payment screen, when the user selects the option to send a payment by scanning the QR code, and wherein the integrated payment system on the user's device allows the user to scan any UPI QR code to detect a virtual payment address (VPA) and proceed with payment transactions.

2. The system of claim 1, wherein the hardware processor is configured to execute the plurality of computer program instructions to generate transaction information corresponding to the executed payment transaction, and wherein the hardware processor is configured to execute the plurality of computer program instructions to send the generated transaction information to the recipient through a programmatic simulation of an action key press.

3. The system of claim 1, wherein the hardware processor is configured to execute the plurality of computer program instructions to access a payment gateway from the input interface of the messaging application, and link the identifier of the detected recipient to the payment gateway within the input interface, and wherein the hardware processor is configured to execute the plurality of computer program instructions to link at least one of an account number, a phone number, or other identifier of the recipient to at least one of identification of bank accounts or a unified payments interface (UPI) account of the recipient.

4. The system of claim 1, wherein the hardware processor is configured to execute the plurality of computer program instructions to execute transaction management operations, and wherein the transaction management operations comprise at least one of an account setup operation, a payment transfer operation, a payment collection operation, an invitation, a support operation, and a balance enquiry handling operation.

5. A computer implemented method comprising a plurality of computer program instructions stored on a non-transitory computer readable storage medium and run on a hardware processor in an integrated payment system to execute an integrated payment method, the method comprising steps of:
   presenting, by a hardware processor, a payment interface element at an input interface of a messaging application on a user device by the hardware processor, and wherein the hardware processor is configured to execute the plurality of computer program instructions to present the payment interface element;
   receiving, by the hardware processor, a selection of the payment interface element, by the hardware processor, and wherein the hardware processor is configured to execute the plurality of computer program instructions to receive the selection of the payment interface element, and wherein the payment interface element on the input interface of the user device is executed executes independently of the messaging application;
   detecting, by the hardware processor, a recipient for a payment transaction during an interaction between at least two user devices through the messaging application based on the selection of the payment interface element, and wherein the hardware processor is configured to execute the plurality of computer program instructions to detect the recipient for the payment transaction;
   presenting, by the hardware processor, an identifier corresponding to the detected recipient, and wherein the hardware processor is configured to execute the plurality of computer program instructions to present the identifier, and wherein the identifier represents account information of the recipient; and
   executing, by the hardware processor, a payment transaction between the user device and the recipient based on the identifier, by the hardware processor, and wherein the hardware processor is configured to execute the plurality of computer program instructions to execute the payment transaction;
   identifying context of the interaction between a user corresponding to the user device and the recipient, and rendering a notification of payment options available on the input interface based on the context by executing the plurality of computer program instruction with the hardware processor, and wherein the detection of recipient includes at least one of identification of bank accounts or a unified payments interface (UPI) accounts linked to at least one of an account number, a phone number, or other identifier of the recipient;
   wherein the payment interface element is a currency icon, or a pay icon, and wherein the payment interface element is displayed on a bar which is arranged above the input interface, and wherein the identifier represents account information of the recipient, a phone number, an account number, a payment gateway identifier, and a transaction address, and wherein the integrated payment system determines a context of the interaction between the users and renders a notification of payment options available to the users within the input interface, on at least one of the input interface and the Graphical User Interface (GUI) of the user application, and wherein the integrated payment system generates and renders prompts regarding a context of a current communication or chat between users, and wherein the integrated payment system detects the context in real time and provides a prompt within the input interface from which the users access payment screens, when the context is related to payments or finance, and wherein the hardware processor is configured to execute the plurality of computer program instructions to execute the complete process of linking directly from within the input interface, thereby precluding a requirement for switching between applications on the user device to perform basic account setup operations and making the linking process more convenient for the user, if a bank account or a UPI account is not connected or linked to the input interface, and wherein the integrated payment system on the recipient's user device generates a sharable quick response (QR) code with the recipient's UPI ID that is shared with the user and allows the user to scan the QR code and proceed to enter the payment amount on the payment screen, when the user selects the option to send a payment by scanning the QR code, and wherein the integrated payment system on the user's device allows the user to scan any UPI QR code to detect a virtual payment address (VPA) and proceed with payment transactions.

6. The method of claim 5 comprises generating, by the hardware processor, transaction information corresponding to the executed payment transaction and sending the generated transaction information to the recipient through a programmatic simulation of an action key press, and wherein the hardware processor is configured to execute computer program instructions to generate and send the transaction information.

7. The method of claim 5 comprises accessing a payment gateway from the input interface of the messaging application and linking the identifier of the detected recipient to the payment gateway within the input interface, and wherein the step of linking the identifier comprises linking at least one of an account number, a phone number, or other identifier of the recipient to at least one of identification of bank accounts or a unified payments interface (UPI) account of the recipient.

8. The method of claim 5 comprises executing transaction management operations, and wherein the transaction management operations comprise at least one of an account setup operation, a payment transfer operation, a payment collection operation, an invitation, a support operation, and a balance enquiry handling operation.

* * * * *